United States Patent
Bonneau et al.

(10) Patent No.: US 6,577,229 B1
(45) Date of Patent: Jun. 10, 2003

(54) MULTIPLE PROTOCOL SMART CARD COMMUNICATION DEVICE

(75) Inventors: Walter C. Bonneau, Escondido, CA (US); Tom Vilhelmsen, Hozbaek (DK); Carlos Ribeiro, San Diego, CA (US); Stefan Rousseau, San Diego, CA (US); Phil Dixon, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 09/329,775

(22) Filed: Jun. 10, 1999

(51) Int. Cl.[7] .................................................. H04Q 5/22
(52) U.S. Cl. ..................... 340/10.41; 235/492; 235/379
(58) Field of Search .................. 340/10.41; 235/492, 235/379, 375, 380

(56) References Cited

U.S. PATENT DOCUMENTS

| | | | |
|---|---|---|---|
| 3,794,941 A | | 2/1974 | Templin |
| 4,403,347 A | | 9/1983 | Iso et al. |
| 5,036,461 A | * | 7/1991 | Elliott et al. ................. 364/408 |
| 5,072,233 A | | 12/1991 | Zanzig |
| 5,263,183 A | | 11/1993 | Owen |
| 5,483,688 A | | 1/1996 | English et al. |
| 5,594,233 A | | 1/1997 | Kenneth et al. |
| 5,714,741 A | | 2/1998 | Pieterse et al. |
| 5,856,809 A | | 1/1999 | Schoepfer |
| 5,894,266 A | | 4/1999 | Wood, Jr. et al. |
| 5,952,935 A | | 9/1999 | Mejia |
| 6,157,966 A | * | 12/2000 | Montgomery et al. ......... 710/8 |

FOREIGN PATENT DOCUMENTS

| | | | |
|---|---|---|---|
| DE | 196 35 311 A1 | 3/1998 | |
| DE | 197 14 068 A1 | 10/1998 | |
| EP | 0 619 662 | 10/1994 | |
| EP | 0 727 759 A1 | 8/1996 | |
| EP | 0 768 540 A1 | 4/1997 | |
| EP | 0 851 377 | 7/1997 | |
| EP | 0 856 807 A2 | 8/1998 | |
| GB | 2 305 074 | 3/1997 | |
| WO | WO 93/09516 | 5/1993 | |
| WO | WO 97/00501 | 1/1997 | |
| WO | WO97/00501 | * 1/1997 | ............. G07F/7/12 |
| WO | WO 98/27670 | 6/1998 | |
| WO | WO 99/16015 | 4/1999 | |
| WO | WO 99/46722 | 9/1999 | |

* cited by examiner

Primary Examiner—Michael Horabik
Assistant Examiner—M Shimizu
(74) Attorney, Agent, or Firm—Brown Martin Haller & McClain, LLP

(57) ABSTRACT

A communication link is established between the smart card and a computer using a valid smart card communication protocol. A smart card communication device determines the valid smart card communication protocol used by a smart card by polling a communication channel using a plurality of smart card communication protocols until a valid acknowledgment message is received. A radio frequency circuit is configured to communicate with the smart card using the valid smart card communication protocol. A digital signal processor having at least two demodulators demodulates an incoming data stream produced by the receiver in accordance with the valid smart card communication protocol in a dynamically reconfigurable manner.

32 Claims, 10 Drawing Sheets

MULTIPLE PROTOCOL SMART CARD COMMUNICATION DEVICE

BACKGROUND OF THE INVENTION

Field of the Invention

The present invention relates generally to smart card systems and more specifically to a smart card system, device and method for communicating with a plurality of smart card communication protocols.

BACKGROUND

The term "smart card" is typically used to refer to various types of devices having an embedded integrated circuit for storing information. The reference to "smart cards" within this disclosure includes both contact and non-contact cards (also referred to as proximity cards). Smart card communication devices are used to write information to the card and to read information from the card. Some smart card communication devices may only have the ability to read from or write to the smart card. Therefore, a smart card communication device may be a smart card reader, a smart card writer or both.

Typically, the smart card communication device is connected to a host computer that regulates transactions between the smart card and the smart card communication device. In some systems, however, the host computer may be part of the smart card communication device. Smart card systems may include any number of host computers and communication devices depending on the particular configuration and requirements of the system.

The smart card is a small, usually credit card shaped, device that contains at least a memory device for storing information and a transceiver to communicate with a smart card communication device. The smart card communication device communicates through the transceiver on the smart card to access the stored information. The smart card communication device may simply read the information, load the information into the memory device or modify existing data in the memory device. For example, if the owner of a smart card uses a smart card containing financial information to make a purchase, the smart card communication device can read the information including the owner's identity and the availability of funds. The smart card communication device can also deduct the purchase amount from the available funds if it has writing capabilities. Further, the communication device can store transaction data on the smart card including the time and location of the transaction in addition to the identity of the communication device.

Existing smart cards can be classified as either contact or non-contact smart cards. It is not necessary for non-contact smart cards (also referred to as proximity cards) to physically contact a smart card communication device to exchange data. Proximity cards typically employ modulated radio frequency (RF) field and impedance modulation techniques to transfer data between the proximity card and the proximity card communication device.

Smart cards have a variety of uses and can be utilized in any transaction that involves the exchange of data or information between individuals and an institution. For example, smart cards can be used to store information including medical records, financial information, vehicle maintenance information, pet information, and a variety of other information traditionally printed on paper or plastic or stored on cards having a magnetic stripe or an optical bar code. Smart card technology has been particularly useful in banking systems and other financial transaction systems. For example, smart card technology has been used effectively in mass-transit systems where the stored value on a smart card is decreased by an amount equal to the fare each time the passenger uses the card to gain access to or exits from the mass-transit system. As described above, other information may be stored or modified on the card such as the time and location of transaction.

The smart card technology is continually expanding in different directions while various manufacturers and industries influence the implementation of smart card systems. As a result, numerous smart card communication protocols have been suggested and several protocols are currently in use. Regulatory and standard committees have defined several standard smart card protocols. For example, the International Organization for Standardization has provided at least two standards for proximity (also referred to as non-contact and contactless) smart cards: ISO 14443 Type A and ISO 14443 Type B. Although many conventional smart card systems use the same carrier frequency for communication, different communication protocols utilize different modulation techniques to transmit and receive data. For example, although ISO 14443 Type A and Type B both require a 13.56 MHZ carrier, ISO 14443 Type A systems use 100% ASK (Amplitude Shift Keying) modulation techniques and ISO 14443 Type B systems use 10% ASK modulation techniques to transmit data from the smart card communication device to the smart card. Further, the Type A smart card communication protocol requires ASK Manchester load modulation with a subcarrier at 847.5 kHz for transmission from the smart card to the smart card communication device. The Type B smart card communication protocol, however, dictates that the smart card transmit a signal modulated using Binary Phase Shift Keying—Non-Return to Zero (BPSK-NRZ) modulation with a subcarrier at 847.5 kHz.

A smart card communication system implemented by Cubic Transportation Systems commercially referred to as the GO CARD® smart card defines another smart card communication protocol (referred to as the third type of smart card communication protocol in the disclosure). The third type of smart card communication protocol uses a 8% NRZ ASK modulation scheme for transmission from the smart card communication device to the smart card and a ASK-NRZ load modulation scheme for transmission from the smart card to the smart card commendation device. The Type A and Type B smart card communication protocols are described in ISO/IEC 14443-2, "Identification cards— Contactless integrated circuit(s) cards—Proximity cards, Part 2: Radio Frequency power and signal interface, 1998-0621" available to the public. The third type of smart card communication protocol is in accordance with the description included in International Application Number PCT/US92/08892, titled "Non-contact Automatic Fare Collection System", filed Oct. 19, 1992, and published May 13,1993 as WO93/09516. The PCT publication is incorporated by reference herein.

Conventional systems do not provide for compatibility between the systems using different smart card communication protocols. With conventional systems, an ISO 14443 Type A smart card can only be used in a Type A system and an ISO 14443 Type B smart card can only be used in a Type B system.

The inconveniences and problems associated with several standards and protocols will increase as smart card systems become more popular and systems using different communication protocols are implemented within the same geographical location and for the same industry. For example, a smart card fare collection system for a mass transit bus system may use one type of smart card communication protocol and a smart card fare collection system for a subway train system may use another type of smart card protocol in the same city. Since many smart cards using different communication protocols do not differ in physical appearance, card holders may become confused regarding which systems will accept a particular smart card. In fare collection systems this may delay entrance and exit of commuters through the mass transit system.

One potential solution requires that the service providers utilizing smart card systems to provide multiple smart card communication devices at each location. Although this potential solution would allow customers having different types of smart cards to use their smart cards at the single location, it is limited in several ways. For example, the multiplicity of smart card readers and writers is not cost effective and will increase the size of smart card communication equipment. Further, if each type of smart card reader/writer has a separate reader or writer port, customers may still be confused since it may not be clear which smart cards can be used in each of the different smart card reader or writer ports.

Therefore, there is need for a smart card communication device, system and method for establishing communications using a plurality of smart card communication protocols.

SUMMARY OF THE INVENTION

In an embodiment of the invention, a smart card communication device polls a communication channel by transmitting a plurality of initiation messages using a plurality of smart card communication protocols. The smart card communication device monitors the communication channel for a valid acknowledgment message in accordance with a valid smart card communication protocol for a predetermined wait period. When the valid acknowledgment message is received, the smart card communication device notifies a master module of the type of smart card that is present and transfers data between the smart card and the master module using the valid smart card protocol. The master module, which contains a computing device, a digital switch and a security device for each of the plurality of smart card communication protocols, routes the data sent by the smart card communication device to the appropriate security device for decryption or authentication.

In this embodiment, the functions of the smart card communication device are analogous to the functions of a radio frequency (RF) modem after a smart card using the valid smart card communication protocol is located. The smart card communication device includes transceiver hardware that has a variable configuration. The appropriate configuration is chosen for receiving the valid smart card communication protocol. One of several demodulators implemented in a digital signal processor (DSP) is used to demodulate an incoming signal after it is acquired by the transceiver hardware.

One advantage of this embodiment is that a plurality of security devices necessary for authentication, decryption, or encryption are remotely located from the smart card communication device in the master module. Since the master module can be maintained in a secure remote location, the system provides security that is likely to be compromised.

Another advantage of this embodiment is that security devices in the master module may be replaced or exchanged without affecting the smart card communication device. The functionality of smart card communication device is not directly dependant on the type of security device needed to communicate with the present smart card. Accordingly, the smart card communication equipment may be located in areas inconvenient to service, such as terminal gates or turnstiles, while still allowing the system to be updated with new security devices located in a more accessible location.

This embodiment also allows for additional smart card communication protocols to be added to the plurality of smart card communication protocols serviceable by the smart card communication device. Since some of the communication process is facilitated by the DSP, the demodulation functions for each of the smart card communication protocols may be modified or additional smart card communication protocols can be supported by downloading new software from a remote location. This may be particularly useful in systems where new smart card communication protocols are introduced after the system infrastructure has been installed.

Yet another advantage of this embodiment is that the functionality of the smart card communication device can be changed by a central computing system that is coupled to the smart card communication device through the master module and a communication network. In addition to changing the software required for demodulating or modulating signals, the central computing system modifies hardware configurations such as transmit power levels and antenna tuning parameters.

Therefore, this embodiment provides a smart card communication system, device, and method for identifying the smart card communication protocol used by a present smart card and establishing a communication link with the smart card by modifying hardware and utilizing an appropriate demodulator within a DSP. The smart card communication device can establish a communication link with a smart card using any one of several smart card communication protocols through a single port.

BRIEF DESCRIPTION OF THE DRAWINGS

The present invention will be better understood from the following detailed description of a first embodiment of the invention, taken in conjunction with the accompanying drawings in which like reference numerals refer to like parts and in which.

DESCRIPTION OF THE PREFERRED EMBODIMENT

Figure 1:
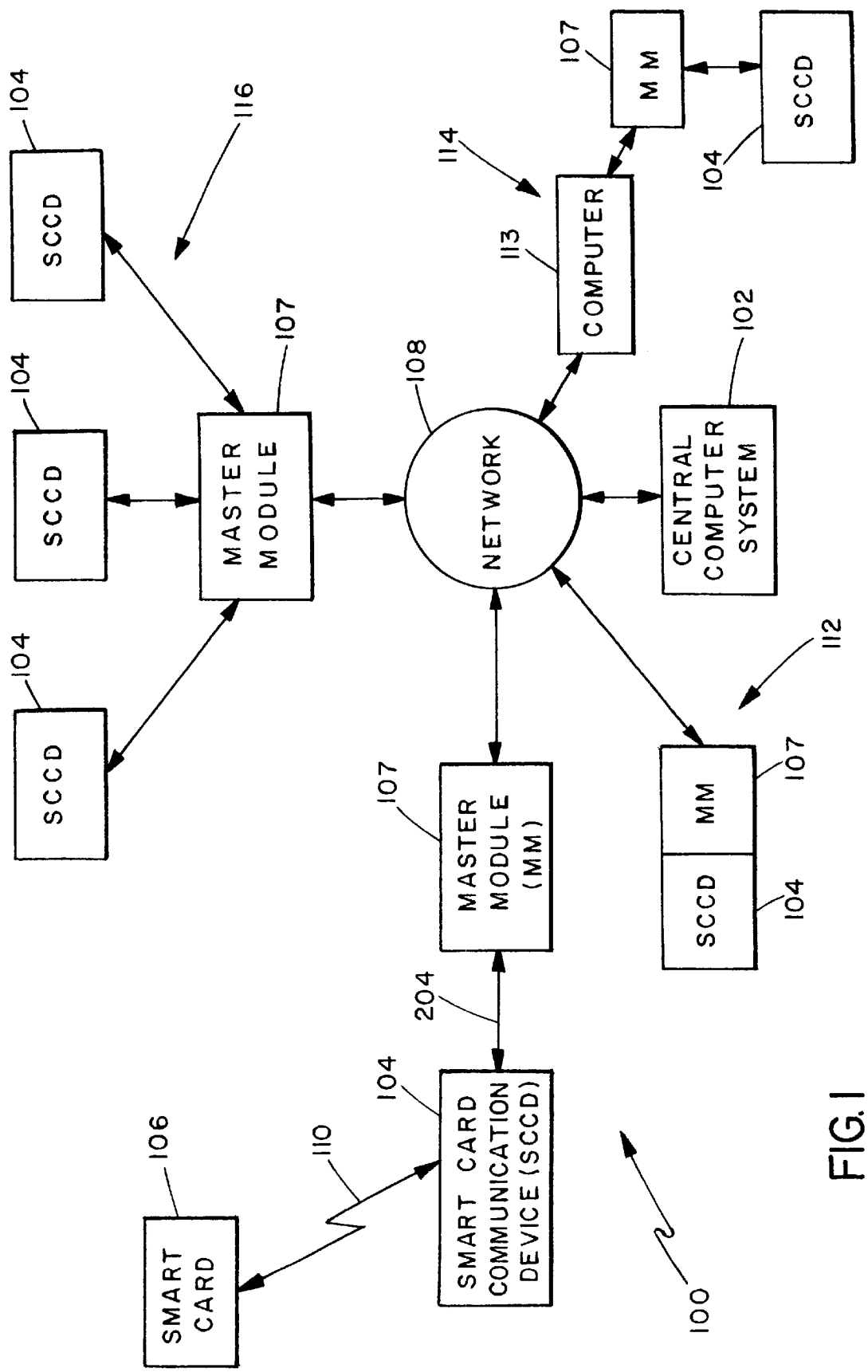
FIG. 1 block diagram of a smart card communication system in accordance with a first embodiment of the invention.

A block diagram of a smart card communication system 100 in accordance with the first embodiment of the invention is shown in FIG. 1. The smart card communication system 100 is implemented as part of a mass transit fare collection system in the first embodiment. Those skilled in the art will recognize that the principles and teachings described herein may be applied to a variety of applications or industries.

The smart card communication system 100 includes at least a central computing system 102, a smart card communication device (SCCD) 104, a master module 107 and a smart card 106. In the first embodiment, several SCCDs 104 are coupled through master modules 107 coupled to a network 108. The network 108 may be the Internet, a Public Switched Telephone Network (PSTN), a Private Branch Exchange (PBX) system, cellular telephone system, Personal Communications Service (PCS) system, point to point microwave system, or any other wired, optical or wireless communication network suitable for transmitting data. Further, the network connection is not necessarily a continuous connection. For example, if the master module and SCCD are located on a bus or other moving vehicle, the master module 107 may be connected to the network 108 at the end of the service time of the bus. In other embodiments, the master module 107 on a moving vehicle may periodically access the network through a wireless link such as a cellular system. Accordingly, any type of network can be used as long as appropriate hardware is coupled to the network and to the various smart card branches to facilitate data communication.

The central computing system 102 may include several computers or processors and communicates with the smart card 106 through the master module 107 and the SCCD 104. The master module 107 performs transactions with the smart card 106 through the SCCD 104 and a communication channel 110 that couples the smart card 106 to the SCCD 104.

In the first embodiment, the transactions occurring between the smart card 106 and the master module 107 occur in a relatively short period of time such as approximately one hundred milliseconds. The master module 107 is coupled to the SCCD 104 through a data channel 204 and is typically located less than a few hundred feet from the SCCD 104. As discussed below, the master module 107 has memory that stores various information that facilitates the transactions between the master module 107 and the smart card 106. The master module 107 also includes security devices for decrypting, encrypting or authenticating sensitive data in accordance with each of the plurality of smart card communication protocols. The master module 107 performs many transactions with several smart cards over a chosen period of time and exchanges information with the central computer system 102 less frequently than every smart card transaction occurrence. For example, a SCCD 104 at the gate of a subway station may be coupled to a master module 107 located several feet away and connected to several SCCDs 104 at other gates in the terminal. The master module 107 may perform several hundred smart card transactions before communicating with a central computer system 102. The master module 107 forwards data identifying the smart cards and the various transactions including deductions and additions to accounts among other information. The central computer system 102 periodically sends a list of invalid smart card numbers (identification numbers) to the master module 107 in order to allow the master module 107 to detect known fraudulent smart cards. In other embodiments, the central computing system 108 may send information including newly issued smart card numbers or a list of valid smart card numbers.

In the first embodiment, the smart card 106 is a non-contact (proximity) card 106 that communicates through a wireless communication channel 110. In other embodiments, however, the smart card 104 may be a contact card where the communication channel is implemented through contacts of the smart card 106.

The smart card communication system 100 may be implemented in any one of a variety of configurations. For example, the master module 107 and the SCCD 104 may be co-located in a single device as in a branch 112 shown in FIG. 1. This configuration may be particularly useful at a smart card station for adding value to a card since the station may be more conveniently located than a SCCD 104 at a gate. A computer 113 may be coupled between the master module 107 and the network as indicated in branch 114. Further, several SCCDs 104 may be coupled to one master module 107 as shown in branch 116. Also, the master module 107 may be directly coupled to the central computer system 102. Accordingly, the configuration of the smart card communication system 100, is chosen in accordance with the particular requirements and intended use of the system 100.

Figure 2:
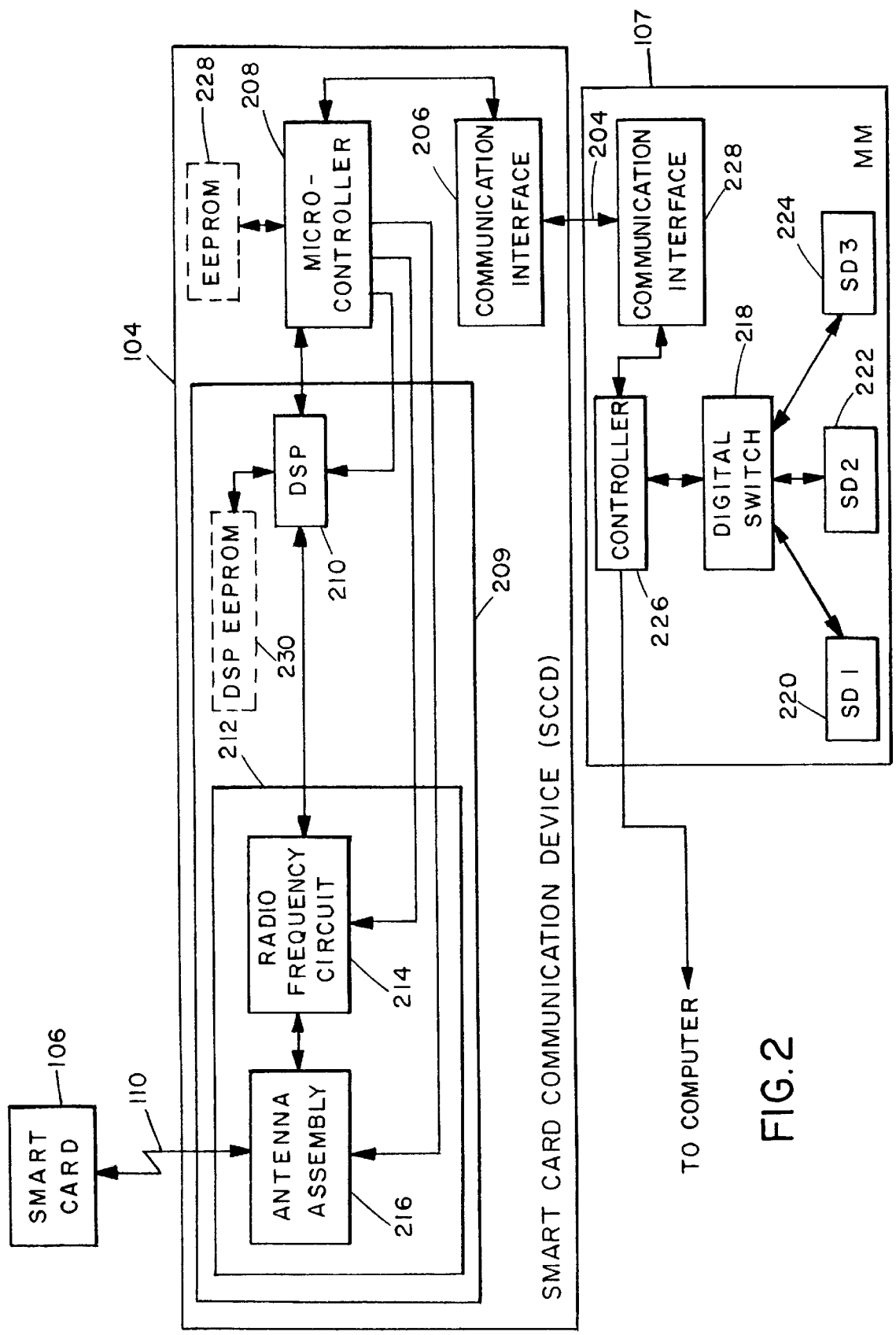
FIG. 2 is a detailed block diagram of a portion of the smart card communication system in accordance with the first embodiment of the invention.

FIG. 2 is a detailed block diagram of a portion of the smart card communication system 100 depicting the smart card 106 and the SCCD 104 coupled to the master module 107 through the network 108 in accordance with the first embodiment. Preferably, the SCCD 104 communicates with the smart card 106 through a wireless communication channel 110. As is explained below in more detail, the smart card 106 and the SCCD 104 may communicate using any one of several smart card communication protocols. The transceiver 209 in the SCCD 104 establishes the wireless communication channel 110 by creating an electromagnetic field, transmitting information through the electromagnetic field, and receiving information from the smart card 106 by observing changes in the electromagnetic field due to modulation by the smart card 106. As mentioned above, other types of transceivers 209 and communication channels 110, however, may be used in alternate embodiments of the invention.

In the first embodiment, the transceiver 209 includes a digital signal processor (DSP) 210 in addition to transceiver hardware 212 which includes a radio frequency (RF) circuit 214 and an antenna assembly 216. As discussed below, modulation and demodulation functions of the transceiver 209 are performed by the RF circuit 214 and the DSP 210 The transceiver hardware 212 mixes and filters an incoming signal to produce an incoming data signal which is demodulated by the DSP 210 using digital processing techniques. Depending on the particular smart card communication protocol, the data may be present within a subcarrier frequency band (Type A and Type B protocols) or at baseband (third type of protocol).

The preferred procedure for establishing a communication link between the central computer system 102 and the smart card 106 includes polling for a valid smart card communication protocol by transmitting a plurality of initiation messages using different smart card communication protocols, identifying the valid smart card communication protocol when a valid acknowledgment message is received from the smart card 106 and establishing a communication link between the master module 107 and the smart card 106 using the valid smart card communication protocol. Preferably, the master module 107 instructs a microcontroller 208 within the SCCD 104 to begin polling for a one or more types of smart cards 106 where each smart card type uses a different smart card communication protocol. Based on the instruction from the master module 107, the micro-controller 208 sends a command signal to the transceiver hardware 212 to configure the transceiver hardware 212 to operate in accordance with one of the smart card communication protocols (a first smart card communication protocol). In addition, the micro-controller 208 instructs a digital signal processor (DSP) 210 to generate an initiation message in accordance with the first smart card communication protocol. The initiation message is transmitted by the transceiver 209 through the communication channel 110.

If a smart card 106 using the first smart card communication protocol receives the initiation message and validly responds with the appropriate acknowledgment message, the RF circuit 214 and the DSP 210 demodulate the acknowledgment message and forward the demodulated message to the micro-controller 208. The micro-controller 208 compares the acknowledgment message to a stored message in memory (not shown) corresponding to the first smart card communication protocol. The micro-controller 208 recognizes the acknowledgment message as a valid response to the first smart communication protocol and reports to the master module 107 that one of the smart card types polled is present. A communication link is established between the master module 107 and the smart card 106 using the first smart card communication protocol. The master module 107 communicates with the central computer system 102 to complete the communication link between the smart card 106 and the central computer system 102.

If a valid acknowledgment message is not received at the micro-controller 208 after a first predetermined wait period, the micro-controller 208 chooses another smart card communication protocol (referred to as a second smart card communication protocol). The micro-controller 208 sends the appropriate command signals to the transceiver to reconfigure the transceiver hardware 212 in accordance with the second smart card communication protocol, instructs the DSP 210 to generate a second initiation message in accordance with the second smart card communication protocol and waits a second predetermined wait period. In the first embodiment, the polling process is continued by sequentially transmitting initiation messages in accordance with each of the smart card types to be polled until a valid acknowledgment message is received or the master module 107 instructs the SCCD 104 otherwise.

The master module 107 transmits and receives data and command signals through a data channel 204. In the first embodiment, the master module 107 is coupled to a communication interface 206 within the SCCD 104 through a serial data connection (204). Preferably, the data channel 204 is implemented in accordance with the Electronics Industries Association (EIA) Recommended Standard RS-485 full duplex. The data channel 204, preferably, provides a high speed serial data connection having a data rate higher than twice the highest anticipated smart card communication protocol data rate. In the first embodiment, the data transmitted between the SCCD 104 and the master module is arranged into data packets including a header and a bit field containing either a checksum or a cyclic redundancy check (CRC). The headers include information indicating the type of data that is contained in the payload as in known techniques. As those skilled in the art will recognize, the data channel may be implemented in accordance with other known standards such as RS-232 or RS-422 and may be modified to increase the efficiency and performance of the communication system 100. Further, the data channel may be any type of data channel capable of transferring data at a sufficient rate between the SCCD 104 and the master module 107 such as an infra red (IR), a wireless, a fiber optic, or an opto-isolated channel.

In the first embodiment the master module 107 includes a communication interface 228, a digital switch 218, a first security device (SD1) 220, a second security device (SD2) 222, a third security device (SD3) 224, and a controller 226. The communication interface 228 is, preferably, a Universal Asynchronous Receiver/Transmitter (UART) capable of establishing communications with the SCCD 104. Data packets received through the communication interface 228 are forwarded to the controller 226. An example of an appropriate controller 226 includes a single board computer using a 486 micro-processor. Software residing on the controller 226 facilitates the overall functionality of the master module 107 and performs such functions as receiving messages indicating the type of card that is present and directing the digital switch 218 to route incoming data the appropriate security device 220–224 based on the contents of the message.

The digital switch 218 is, preferably, a Field Programmable Gate Array (FPGA) that connects one of the three security devices to the controller 226. The connected security device facilitates the communication between the master module 107 and the smart card 106 through the SCCD 104 by encrypting, decrypting or authenticating data that is received or transmitted as required.

In the first embodiment the first security device 220 is used to encrypt and decrypt data when the master module is communicating with a Type A smart card 106. An example of an appropriate security device A 220 is a Mifare ASIC.

The second security device 222 is utilized by the master module when communicating with a Type B smart card 106. An example of an appropriate security device for Type B smart cards is a SAM (Security Access Module) or a group of several SAMs.

When the master module 107 communicates with a smart card 106 using the third type of smart card communication protocol, the third security device 224 is used to authenticate the data transmitted between the master module 107 and the smart card. The third security device 224 is preferably a secure memory device.

In the first embodiment, the communication interface 206 is a Universal Asynchronous Receiver/Transmitter (UART) that performs serial to parallel and parallel to serial conversions between the data channel 204 and the micro-controller 208. As described above, the data channel 204 is a serial data channel implemented in accordance with the RS-485 full duplex standard and should have a data rate of at least 920 kb/s in the first embodiment. The communication interface, however, may be any one of various circuits required to adapt communications from the master module 107 to the micro-controller 208.

The micro-controller 208 is a digital processor, microprocessor, ASIC, or any other type of processor capable of storing and running predetermined programs to facilitate the overall functionality of the SCCD in addition to the specific functions described herein. The micro-controller 208 has an operating speed sufficient facilitate data communications between the master module 107 and the SCCD 104. An example of an appropriate device that can be used as the micro-controller 208 includes the PIC16F877 microcontroller (commercially available from Microchip Company) which includes an on-board flash memory (228) in addition to memory for storing software and other information, can perform at 14.7456 MHZ to facilitate a 1 Mb/s data channel rate and includes a UART for use as the communication interface 206. The micro-controller 208 is coupled to an Electrically Erasable Programable Read Only Memory (EEPROM) 228 such as the on-chip flash memory (230) within the micro-controller. The EEPROM 228 is illustrated with a dashed line to indicate that the EPPROM 228 may be implemented within the micro-controller 208 as in the first embodiment or on a separate device in alternate embodiments. The EEPROM 228 is preferably a boot flash device (such as implemented with the PIC16F877 microcontroller 208)) to allow the sections of the code residing on the boot flash device to be changed without erasing the entire contents of the EEPROM 228.

The DSP 210 is a digital signal processor capable of storing and performing modulation and demodulation in accordance with the plurality of smart card communication protocols. Preferably, the DSP 210 can be reprogrammed to add smart card communication protocol modulation or demodulation schemes or to modify schemes implemented on the DSP 210. An example of a DSP 210 suitable for purposes of the first embodiment is the TMS320C5410 DSP manufactured by the Texas Instruments Company. In the first embodiment, the DSP 210 is coupled to a DSP EEPROM 230 such as an off-chip flash memory (230) located in the SCCD 104. The DSP EEPROM function block 230 is illustrated using a dashed line to indicate that in alternate embodiments, the DSP EEPROM 230 may be implemented within the DSP 210, as an off-chip memory located with the DSP 210 or as a separate device located externally to the SCCD 104. The firmware residing in DSP EEPROM 230 includes default code for both the DSP 210 and the micro-controller 208, the latest revision of code for the DSP 210 and the micro-controller 208, and update status flags and checksum information to allow for integrity checks on new code before execution.

Although in the first embodiment, EEPROMs are used for storing code, other types of memory that allows code to be re-written can be used. For example, the EEPROM 228, and the DSP EEPROM 230 can be Ferro-electric Random Access Memory (FRAM) devices.

Additional discrete circuitry, logical gates and power sources are coupled to the integrated circuits discussed above in accordance with known techniques. For example, various coupling discrete components such as capacitors may be used for noise suppression. Further, those skilled in the art will recognize that the various functional blocks depicted in FIG. 2 may implemented in a variety of hardware and software configurations. For example, the DSP 210 may be implemented within a processor that performs the functions of the micro-controller and the communication interface 206 may be a stand alone UART circuit in alternate embodiments. Further, devices such as FPGAs and Complex Programmable Logic Devices (CPLD) may also be used in conjunction or instead of the various processor devoices described herein.

As discussed above, the transceiver 209 establishes the wireless communication channel between the SCCD 104 and the smart card 106. In the first embodiment, modulation and demodulation of transmitted and received signals is performed jointly by a radio frequency (RF) circuit 214 within the transceiver hardware 212 and the DSP 210. The RF circuit 214 includes appropriate hardware for mixing and filtering a received signal to produce a modulated low frequency received signal in accordance with a plurality of smart card communication protocols. In the first embodiment, the structure of the RF circuit 214 is defined by the command signal from the micro-controller 208. As described below in more detail, an incoming RF signal is mixed with a local oscillator (LO) signal and filtered to shift the incoming signal to a desired frequency bandwidth to produce a shifted signal. The DSP 210 continues the demodulation of the incoming RF signal by demodulating the shifted signal using digital signal processing techniques in accordance with the chosen (valid) smart card communication protocol. The mixing signal, filter and DSP demodulation function are chosen in accordance with the particular smart card communication protocol and are controlled by the micro-controller 208. Signals to be transmitted are modulated using the appropriate modulation technique and transmitted through the antenna assembly.

In the first embodiment, the functionality of the DSP 210 and the micro-controller 208 may be modified by updating the firmware residing in the DSP 210 and the micro-controller 208. Modifications to the firmware may be required or advantageous for a variety of reasons. In addition to modifying the firmware to allow the SCCD 104 to communicate using a new smart card communication protocol, the firmware may be modified to change an existing demodulation or modulation scheme implemented in the DSP 210. The change may be necessary due to changes in a protocol standard or other reasons including implementation improvements to the existing schemes. Also, software "bugs" in the firmware may be corrected. Other functions performed by the firmware, in addition to communication protocol functions, may be corrected, improved or modified. For example, diagnostic functions or indicator function such as LED signaling and may be changed by updating the firmware.

Although the master module 107 facilitates the reprogramming of the DSP 210 and the micro-controller 208, the change in code can be initiated by the computer or the central computer system 102. This may be particularly useful if a universal change to all SCCDs 104 within the system is necessary. The updated code can be sent from the central computer system 102 without the need to physically locate reprogramming equipment at the location of each SCCD or master module 107.

The master module 107 modifies the contents of the DSP EEPROM 230 by communicating with the DSP 210 through the data channel 204, communication interface 206 and the micro-controller 208. The DSP 210 has read and write control over the DSP EEPROM 230 which allows the master module 107 access to the code residing in the DSP EEPROM 230. The master module has access to the code controlling the functionality of the micro-controller 208 that resides in the EEPROM 228 through the DSP 210. In the first embodiment, the master module 107 can modify sections of code in the EEPROM 228 by changing the code in the DSP EEPROM 230. Since the DSP 210 has access to the code in the EEPROM 228, the modified code operating in the DSP 210 re-programs the EEPROM 228.

Preferably, the DSP EEPROM 230 and the EEPROM 228 have blocks of code that are "locked" and blocks of code that are "locked down". Blocks that are "locked" can be unlocked with software and re-written while "locked down" blocks can not be unlocked with software and are, therefore, secure and cannot be re-written. The "locked down" blocks contain "safe" code that facilitates operation when integrity test on existing code fails or communications between the DSP 210 and the micro-controller 208 can not be established.

The master module verifies the code after modifying the contents of the DSP EEPROM 230 by reading the code, and verifying the length, checksum, and Cyclic Redundancy Check (CRC) information which is also written into the DSP EEPROM 230 during the reprogramming procedure. When the code in the EEPROM 228 is being changed, an "update_busy" flag is written into the EEPROM 228. This "update_busy" flag is cleared when the code update is complete and can be used to detect, for example, interruption of the procedure by a power failure.

The DSP 210 boots from the "safe" code located within the DSP EEPROM 230. If communications between the DSP 210 and the micro-controller 208 fail or if the DSP 210 detects that a code update is still pending, the DSP 210 will reprogram the micro-controller 208 with the "safe" code. The master module 107 re-attempts to reprogram the DSP 210 and the micro-controller 208 after the system is reset with the "safe" code.

If the DSP 210 and the micro-controller 208 establish successful communication, the DSP 210 performs the CRC and the checksum procedure using the new DSP code residing in the DSP EEPROM 230. The DSP 210 continues by loading this new code into Random Access Memory (RAM) and executing it.

In addition to controlling the demodulation and modulation process of the SCCD 104, the new code can be used to modify other functionality of the SCCD 104. For example, the new code may modify the method that is used to tune antenna hardware. Also, the configuration of the transceiver 212 may be changed remotely by modifying the code. Self diagnostic procedures of the SCCD 104 may also be changed by modifying code that controls such procedures. Those skilled in the art will recognize based on these teachings that other functions controlled by software or firmware may be modified by re-programming the one or more processors within the SCCD 104 from a remote location such as the central computer system.

Figure 3:
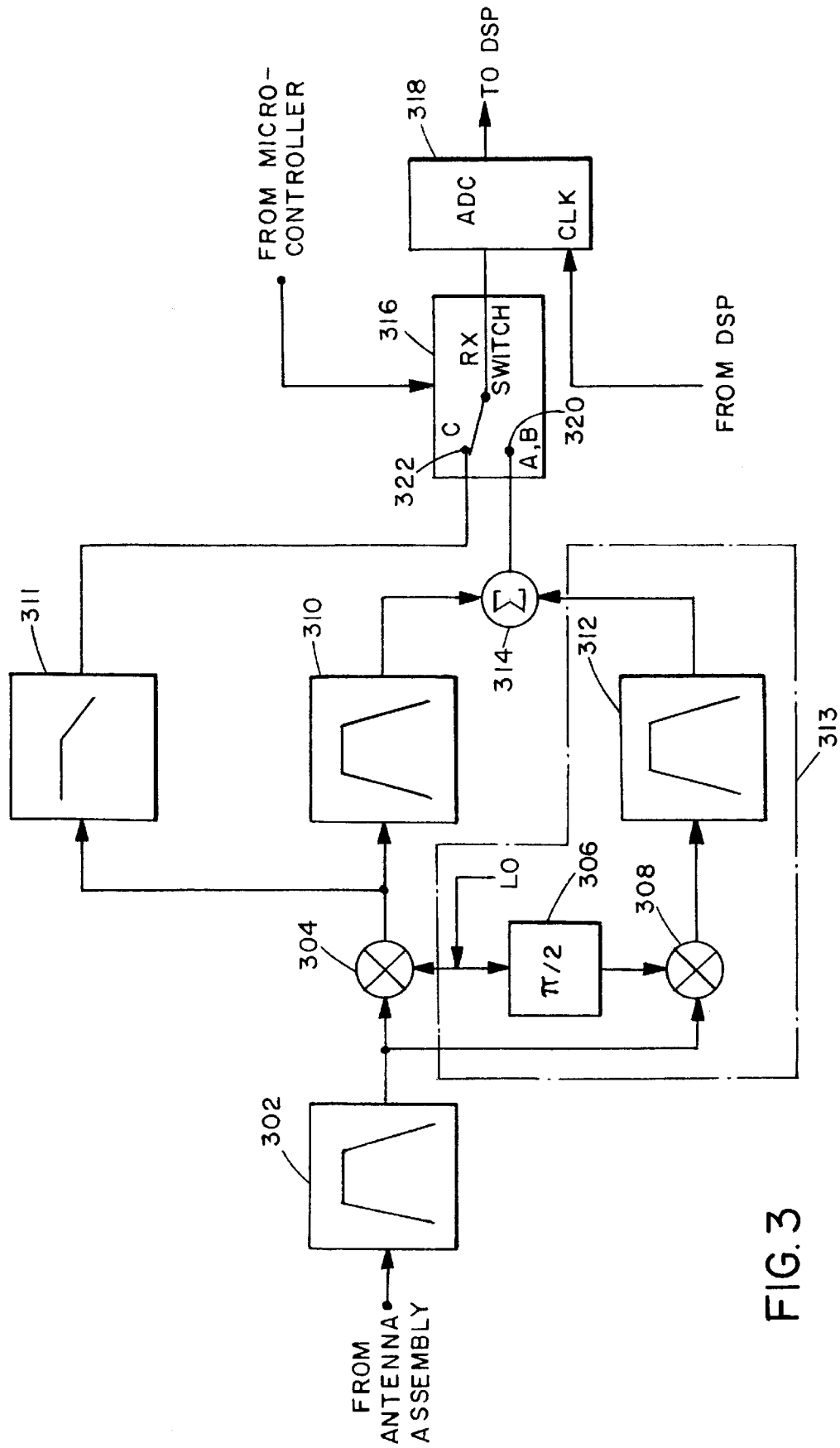
FIG. 3 is a block diagram of a receiver portion of the RF circuit in accordance with the first embodiment of the invention.

FIG. 3 is a block diagram of a receiver portion of the RF circuit 214 in accordance with the first embodiment of the invention. When in a receive mode, the RF circuit 214 receives an incoming signal from the antenna assembly 216. As explained above, the smart card 106 modulates the electromagnetic field produced by the RF circuit 216 which relates to a detectable impedance change of the antenna. In the first embodiment, the electromagnetic field has a frequency of 13.56 MHZ which is the carrier frequency for each of the three types of smart card communication protocols that can be received. The three smart card communication protocols include ISO Type A, ISO Type B and the third type of communication protocols. The incoming signal is filtered in a bandpass filter 302 having a center at 13.56 MHZ to provide selectivity.

A local oscillator signal having a frequency equal to the carrier frequency (13.56 MHZ) is injected into a first mixer 304 and into a phase shifter 306. The incoming signal is mixed with the LO signal in the first mixer 304 and a phase shifted version of the LO signal produced by the phase shifter 306 in a second mixer 308 to produce an in-phase (I) component of a received baseband signal and a quadrature (Q) component of the received baseband signal, respectively. In accordance with the Type A and Type B smart card communication protocols, the I component and the Q component. are filtered in bandpass filters 310, 312. Preferably the bandpass filters are identical, have a bandwidth of 1.3 MHZ and a center frequency of 847.5 KHz. After passing through the filters 310, 312, the I component and the Q component are combined in a signal combiner 314. Since both Type A and Type B smart card communication protocols include a sub-carrier, the data transmitted from the smart card 106 is produced at the output of the combiner (A-B port 320). Since, however, the third type of protocol does not include information on a sub-carrier, the data transmitted from a smart card 106 using the third type of protocol is produced at the output of the first mixer 304 port 322) at baseband. The baseband signal is filtered in a low pass filter 311 to remove mixing products and other undesired signals. The low pass filter 311 has a bandwidth of approximately 57 kHz in the first embodiment. The micro-controller 208 sends a command signal to the RX switch 316 to select the appropriate signal for demodulation by the DSP 210. The selected signal present at the output of the RX switch 316 is converted into a digital signal in the analog to digital converter ADC 318. A clock signal produced by the DSP 208 facilitates the timing of the ADC 318.

The digital signal produced at the output of the ADC 318 is forwarded to the DSP 210 for demodulation. As discussed below, the DSP 210 demodulates the signals having sub-carriers (i.e. those produced at the A-B port 320) in accordance with the type of smart card communication protocol used by the smart card 106. Since the third type of smart card communication protocol does not utilize a sub-carrier, the baseband signal produced at port C is demodulated directly at baseband by the DSP 210. In another embodiment of the RF circuit 214, the quadrature branch 313 is omitted.

Figure 4:
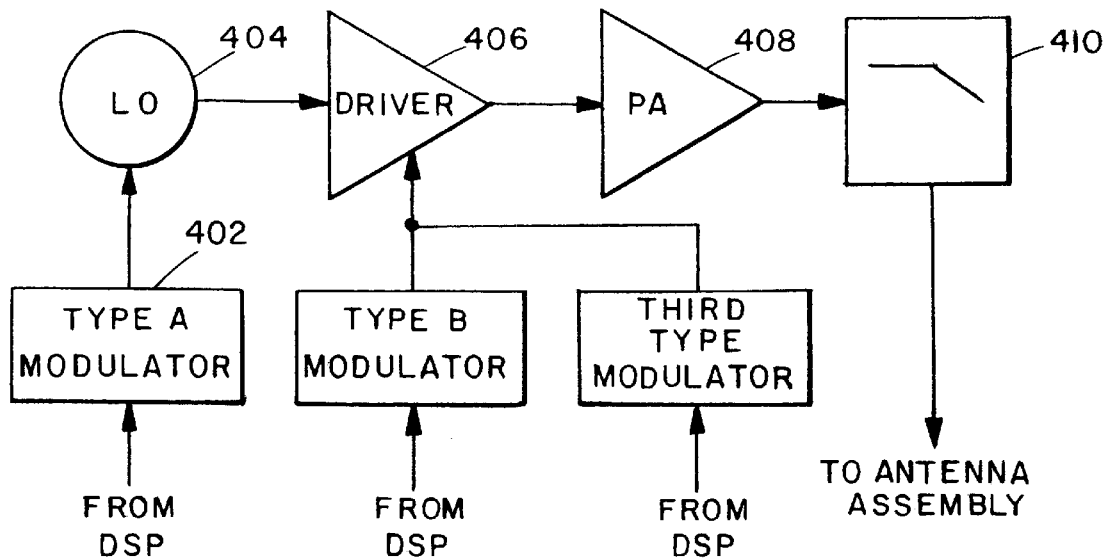
FIG. 4 is a block diagram of a transmitter portion of the RF circuit in accordance with,the first embodiment of the invention.

FIG. 4 is block diagram of the transmitter portion of the RF circuit 214 in accordance with the first embodiment of the invention. As described above, the ISO Type A smart card communication protocol requires a 100% Modified Miller modulation in transmissions from the SCCD 104 to the smart card 106. When a message using the Type A protocol is transmitted, a Type A modulator 402 modulates the LO 404 based on signals transmitted from the DSP 210. The Type A modulator 402 pulses the LO signal produced by the LO 404 in accordance with the data to be transmitted and the Type A protocol. The Type A transmission signal is amplified by a amplifier driver stage (driver) 406 before it is amplified by a power amplifier (PA) 408. In the first embodiment, the driver 406 provides a fixed gain of approximately 10 dB and is designed in accordance with known techniques. Preferably, the PA 408 amplifies the Type A transmission signal to approximately 28 dBm before the signal is filtered by a low pass filter (LPF) 410. In the first embodiment, the LPF 410 is a 7th order low pass filter and is designed using known techniques to reduce spurious emissions. The filtered signal is transmitted through the antenna assembly 216 to the smart card 106.

If a message is transmitted using Type B or the third type smart card communication protocols, the DSP 210 forwards data to the Type B-third type modulator 412. A third type modulator 413 is used to modulate the outgoing signal if the smart card communication protocol used for communication link is the third type. Since the Type B requires a 10% and the third type requires 8% NRZ modulation, the Type B modulator 412 and the third type modulator are similar. Both modulators (412, 413) achieve the appropriate level of modulation by varying the gain of the driver 406 in accordance with the data to be transmitted and the smart card communication protocol to produce a Type B transmission signal or third type transmission signal. The signals produced at the output of the driver 406 when Type B or the third type of modulation is used are amplified in the PA 408 and filtered as described above in reference to Type A modulation.

In a second embodiment of the transmitter portion of the RF circuit 214, the driver 406 is omitted and the Type B-third type modulator is coupled directly to the PA 408. As those skilled in the art will recognize, a driver 406 is not necessary if the LO 404 can produce a signal having a power level sufficient to drive the PA 408.

In alternate embodiments, the outgoing signal can be generated in the micro-controller 208 rather than in the DSP 210. As those skilled in the art will recognize, the particular division of functionality between the micro-controller 208 and the DSP 210 is based on factors such as the speeds and capacity of the two components in addition to other factors dictated by the particular system 100 requirements.

Figure 5:
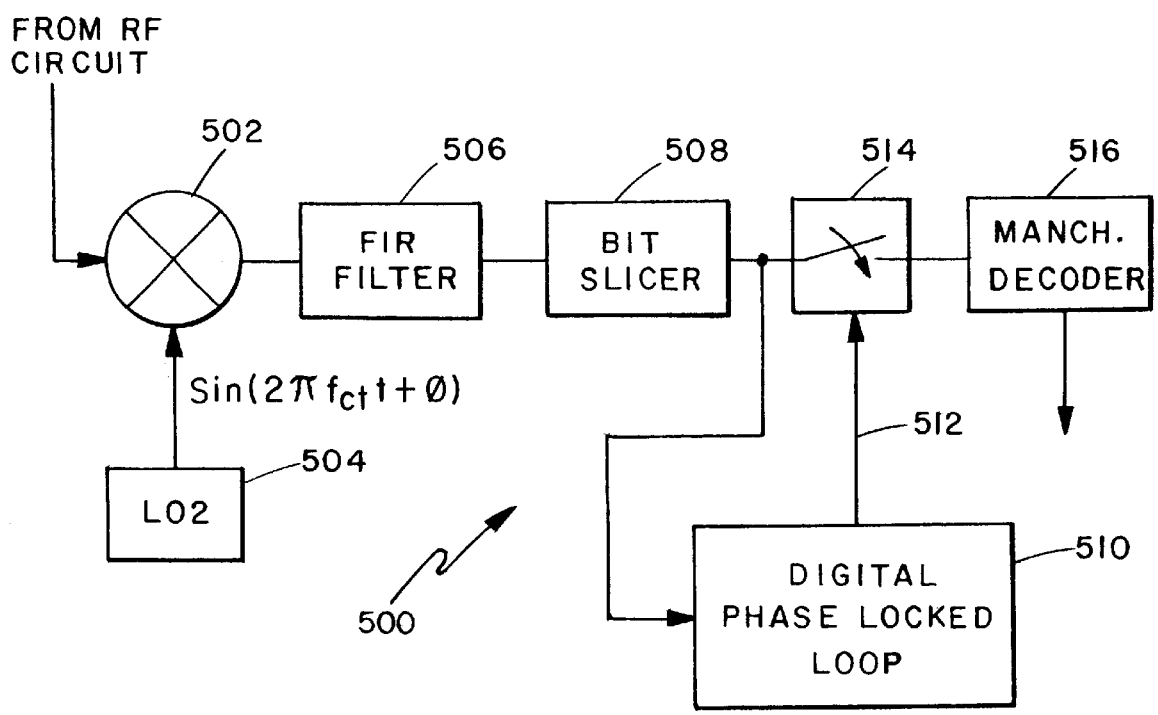
FIG. 5 is a block diagram of a functional representation of the demodulation implementation in the DSP for a Type A smart card communication protocol in accordance with the first embodiment of the invention.

FIG. 5 is a block diagram of a functional representation of the demodulation implementation in the DSP 210 for a Type A smart card communication protocol in accordance with the first embodiment of the invention. The functional blocks shown in FIG. 5 are included for illustrative purposes and the function of each of the blocks is performed using digital processing techniques within the DSP 210. Those skilled in the art will recognize that some or all of the functions performed in the DSP 210 may be performed using hardware or programmable logic in alternate embodiments.

As is known, the Type A smart card communication protocol uses a ASK-Manchester modulation scheme to transmit data at 106 Kbit/s from the smart card 106 to the SCCD 104. The sub-carrier frequency is 847.5 kHz which is one sixteenth of the carrier frequency of 13.56 MHZ. Manchester coding (also known as split phase coding) dictates that a logic "1" be represented by a "1" for the first half of a bit duration and a "0" for the second half of the bit duration. A logic "0" is represented by a "0" for the first half of the bit duration and a "1" for the second half of the bit duration. As is known, phase ambiguity is resolved by transmitting a known synchronization sequence from the smart card to the SCCD 104 which is defined as a "1" by the ISO for Type A smart cards. The digital demodulator depicted in FIG. 5 generates a square wave in a digital phase lock loop (DPPL) that locks onto the incoming data stream produced by the ADC. Since the DPPL locks at a ninety degree offset form the incoming data stream and the initial bit is known, a sampled data stream is produced which can be decoded.

The digital signal produced by the ADC is received at a quadrature mixer 502 and is mixed with a second local oscillator (LO2) 504 signal. The frequency of the second LO 504 is chosen to be the same as the sub-carrier frequency (i.e. 847.5 kHz) in order to shift the data signal located with the subcarrier frequency band to baseband. The signal generated by the second LO is function of time defined as $\sin(2\Pi f_c t + \phi)$, where $f_c$ is the frequency of the subcarrier, t is time, and $\phi$ is a phase offset. The incoming baseband digital signal produced by the quadrature mixer 502 is filtered by a Finite Impulse Response (FIR) low pass filter 506 to remove noise outside of the desired data frequency bandwidth. The bit slicer 508 processes the high frequency signal baseband digital signal to produce an incoming logic signal having a bit rate of 106 kb/sec and a frequency of the sampling rate of the ADC 318 (3.4 MHZ in the first embodiment). As is known, the bit slicer 508 produces a logic signal characterized by a series of "0"s and "1"s. The digital phase locked loop (DPLL) 510 phase locks to the logic signal to produce a bit clock signal 512. A sampler 514 samples the signal near the centers of each of the incoming bits of the logic signal based on the bit clock 512 to produce the 106 kb/sec incoming data signal. The Manchester decoder 516 decodes the signal produced at the output of the sampler 514 to produce the incoming data signal that is forwarded to the micro-controller 208.

Figure 6:
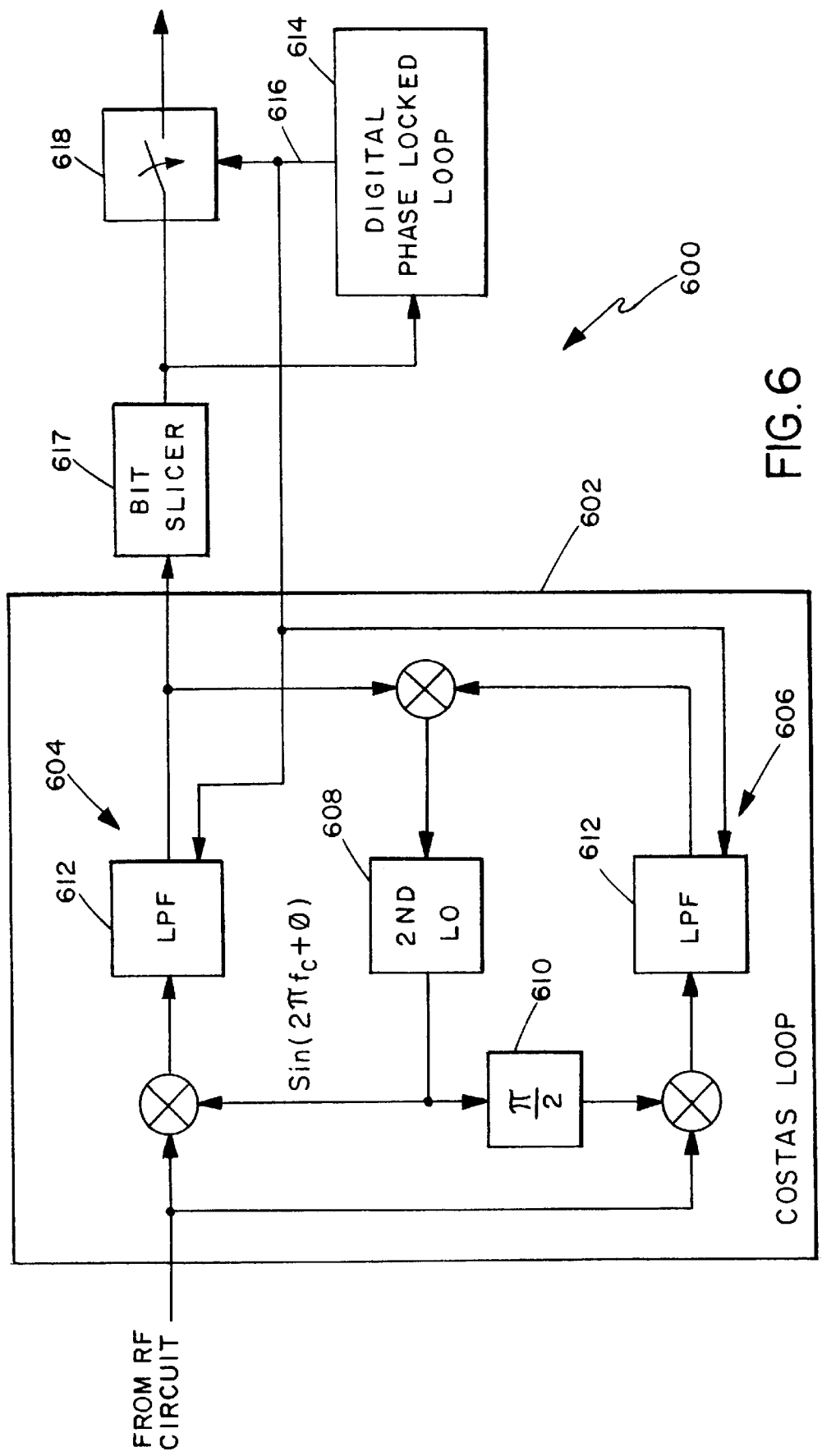
FIG. 6 is a block diagram of a functional representation of the demodulation implementation in the DSP for a Type B smart card communication protocol in accordance with the first embodiment of the invention.

FIG. 6 is a block diagram of a Type B demodulator 600 in accordance with the first embodiment of the invention. The signal produced at the output of the RF circuit 214 is processed by a Costas loop 602 to produce a baseband signal. As is known, a Costas loop 602 is a circuit that locks a free-running oscillator to the phase of an incoming signal. The Costas loop 602 includes an I branch 604 that locks to an in-phase component (I component) of the incoming signal and a Q branch 606 that locks to a quadrature component (Q component) of the incoming signal. The two branches 604, 606 drive the phase ($\phi$) of a second LO 608 that produces a signal that is a function of time defined as $\sin(2\Pi f_c t + \phi)$, where $f_c$ is the frequency of the subcarrier, t is time, and $\phi$ is the phase. The second LO signal is shifted by 90 degrees by the phase shifter 610 before it is injected into the Q branch 606. A digital low pass filter 612, implemented as part of the I and Q branches 604, 606, is synchronized to the bit clock signal produced by a DPLL 614. A bit slicer 617 processes the high frequency signal baseband digital signal produced by the Costas loop 602 to produce an incoming logic signal having a bit rate of 106 kbit/sec and a frequency of the sampling rate of the ADC 318 (3.4 MHZ in the first embodiment). The DPLL 614 locks onto the logic signal produced by the bit slicer 617 to produce the bit clock 616. A sampler 618 samples the logic signal to produce a bit signal that is forwarded to the micro-controller 208.

The lock time of the Costas loop 602 depends on the value of $\phi$. Since the ISO standard for Type B smart cards allows for at least 15 bit periods of a logic high period before data is transmitted, the Costas loop should preferably be implemented to have a lock time less than 15 bit periods. In the first embodiment, the first transition from high to low is used to synchronize the phase, $\phi$ of the Costas loop 606.

Figure 7:
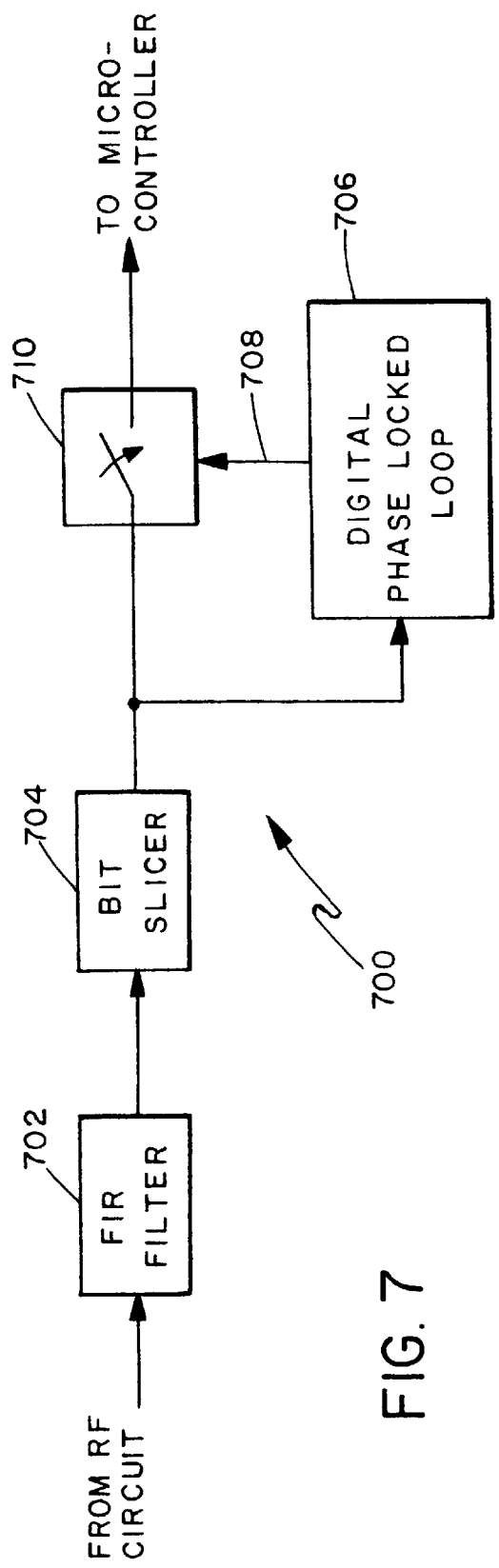
FIG. 7 is a block diagram of a functional representation of the demodulation implementation in the DSP for demodulating a signal modulated in accordance with a third type of smart card communication.

FIG. 7 is block diagram of a third type of demodulator 700 suitable for demodulating a signal modulated in accordance with the third smart card communication protocol. A FIR filter 702 filters the baseband signal received from the RF circuit 214 that has a frequency determined by the ADC and a data rate equal to 115.2 Kbit/sec. The bit slicer 704 processes the baseband signal to produce a logic signal with a frequency of the ADC sampling rate and having amplitude shifting between a logic "0" and a logic "1". A DPLL 706 locks to the logic signal to produce a bit clock signal 708. A sampler 710 samples the 115.2 Kbit/sec logic signal near the centers of each bit based on the bit clock signal 708.

Figure 8:
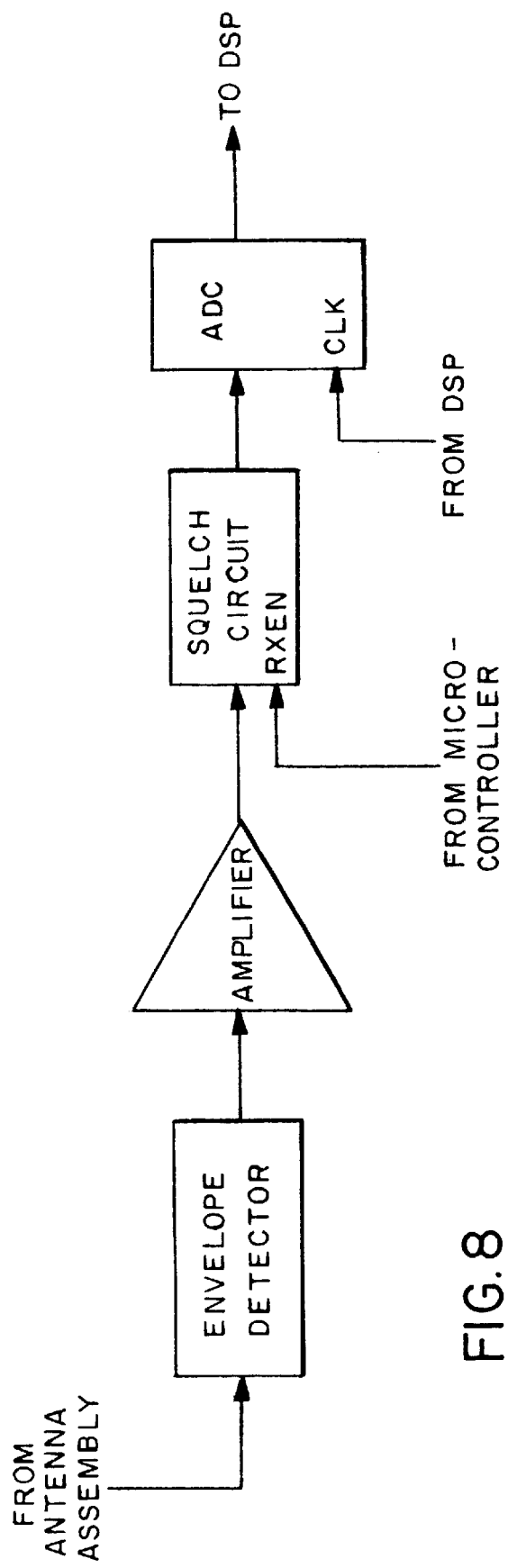
FIG. 8 is block diagram of the receiver portion of the RF circuit in accordance with a third embodiment of the invention.

FIG. 8 is a block diagram of a third embodiment of the receiver portion of the RF circuit 214. The incoming RF signal is received by the envelope detector 802 to produce a baseband received signal. As is known, the envelope detector 802 "tracks" the amplitude modulated signal to produce an analog representation of the modulated data. The analog data is amplified to usable levels in the amplifier 804. The signal is coupled through a squelch circuit 806 to an analog to digital converter (ADC) 806. The ADC samples the analog signal to produce a high frequency digital signal that is coupled to the DSP 208. A receiver enable (RX-EN) switch on the squelch circuit 804 provides a mechanism to switch the squelch circuit on and off with a receiver enable signal from the micro-controller 208. In other embodiments, the DSP 210 may provide the receiver enable signal.

Figure 9:
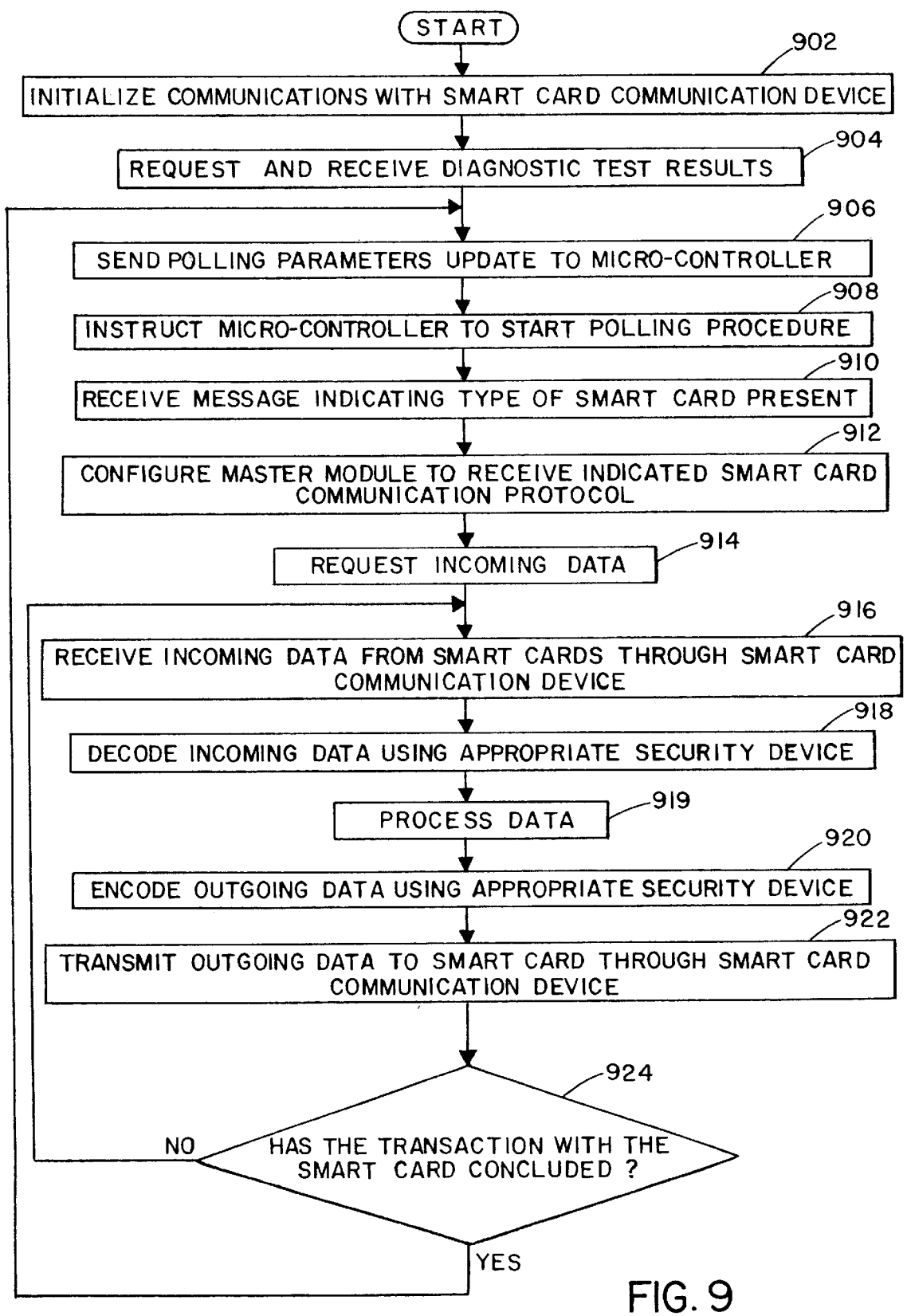
FIG. 9 is a flow chart of a method of establishing a communication link between a smart card and a master module performed at the master module in accordance with the first embodiment.

FIG. 9 is a flow chart of a method for establishing a communication link between the master module 107 and a smart card performed in the master module 107 in accordance with the first embodiment of the invention. At step 902, the master module 107 initializes communication with the smart card communication device by communicating with the microprocessor. Using known techniques, the master module 107 sends and receives the appropriate messages to identify the smart card communication device and selects a SCCD 104 to initialize communications.

At step 904, the master module 107 requests and receives diagnostic test results from the smart card communication device. As described below, the smart card communication device performs a diagnostic test to determine the condition of the SCCD 104 after receiving the request from the master module 107. The results are transmitted to the master module 107 from the microprocessor through communication interface 206 and the data channel 204.

After determining that the SCCD 104 is operating sufficiently, the master module 107 sends a polling parameter update to the micro-controller 208 at step 906. The polling parameters, in the first embodiment include the types of smart cards that should be polled, predetermined wait periods, and supplies a random number for collision resolution techniques used in accordance with the third type of smart card communication protocol.

In alternate embodiments, the polling parameters may include a variety of values or instructions for performing the polling function. For example, the polling parameters may include a polling sequence indicating the pattern that should be followed when polling. A polling sequence parameter may be particularly useful in communication systems where a one or more smart card types are rare and the smart card communication protocols are rarely encountered by the SCCD 104. The polling sequence parameter instructs the SCCD 104 to poll in a sequence that does equally poll each type of smart card and less frequently polls for the rare types of smart cards.

At step 908, the master module 107 instructs the micro-controller 208 to begin the polling procedure. The SCCD 104 performs the polling procedure in accordance with the polling parameters after receiving the instruction. The SCCD 104 continues the polling procedure until receiving a different instruction from the master module 107 or until it determines that a smart card is present that is using a valid smart card communication protocol.

At step 910, the master module 107 receives a message from the SCCD 104 identifying the smart card communication protocol of the present smart card.

The master module 107 is configured to receive the indicated smart card communication protocol at step 912. As explained above, the master module 107 receives the incoming data sent from the smart card that has been demodulated by the SCCD 104. Accordingly, the differences between the master module 107 configurations are due to the differences in the particular data protocols as transmitted by the SCCD 104 to the master module 107 and are not due to the different modulation schemes of the various smart card communication protocols.

At step 914, the master module 107 requests the incoming data to be transmitted from the SCCD 104.

At step 916, the master module 107 receives the incoming data acquired by the SCCD 104 from the smart card. As explained in more detail below, the SCCD 104 receives the incoming RF signal from the smart card, demodulates it using the appropriate demodulation technique, and transmits the resulting incoming data to the master module 107 in the appropriate format. The master module 107 removes the data added by the SCCD 104 to the incoming data for transmission purposes to the master module 107 to receive the pure incoming data. For example, the master module 107 unpacks the data from any packets that may have been used for transmission purposes and removes and headers. As those skilled in the art will recognize, various data protocols or schemes can be used to transfer the incoming data from the SCCD 104 to the master module 107 and therefore the reception and processing of the incoming data as sent by the SCCD 104 will vary according to the particular system data protocol used between the SCCD 104 and the master module 107.

At step 918, the master module 107 decodes the incoming data using the appropriate security device. As explained above, the master module 107 forwards the incoming data to the appropriate security device based on the information transmitted to the master module 107 from the SCCD 104.

The master module 107 processes the incoming data at step 919. Any value deductions or additions to the account are performed in addition to any other transactions that are to be completed based on the incoming data.

At step 920, the master module 107 encodes the outgoing data to be transmitted to the smart card using the appropriate security device. As explained above, the controller 226 selects the appropriate security device (220–224) with the digital switch 218.

At step 924, the master module 107 determines if the transaction with the smart card has concluded. When all the steps of the particular communication flow program for the present smart card 106 have been validly performed and all CRCs and checksums are determined to be valid, the master module 107 determines that the transaction is complete. If the transaction is over, the method returns to step 906 where any changes to the polling parameters can be made by updating the polling parameters. If the transaction is not over, the method continues communicate with the smart card by returning to step 916.

Figure 10:
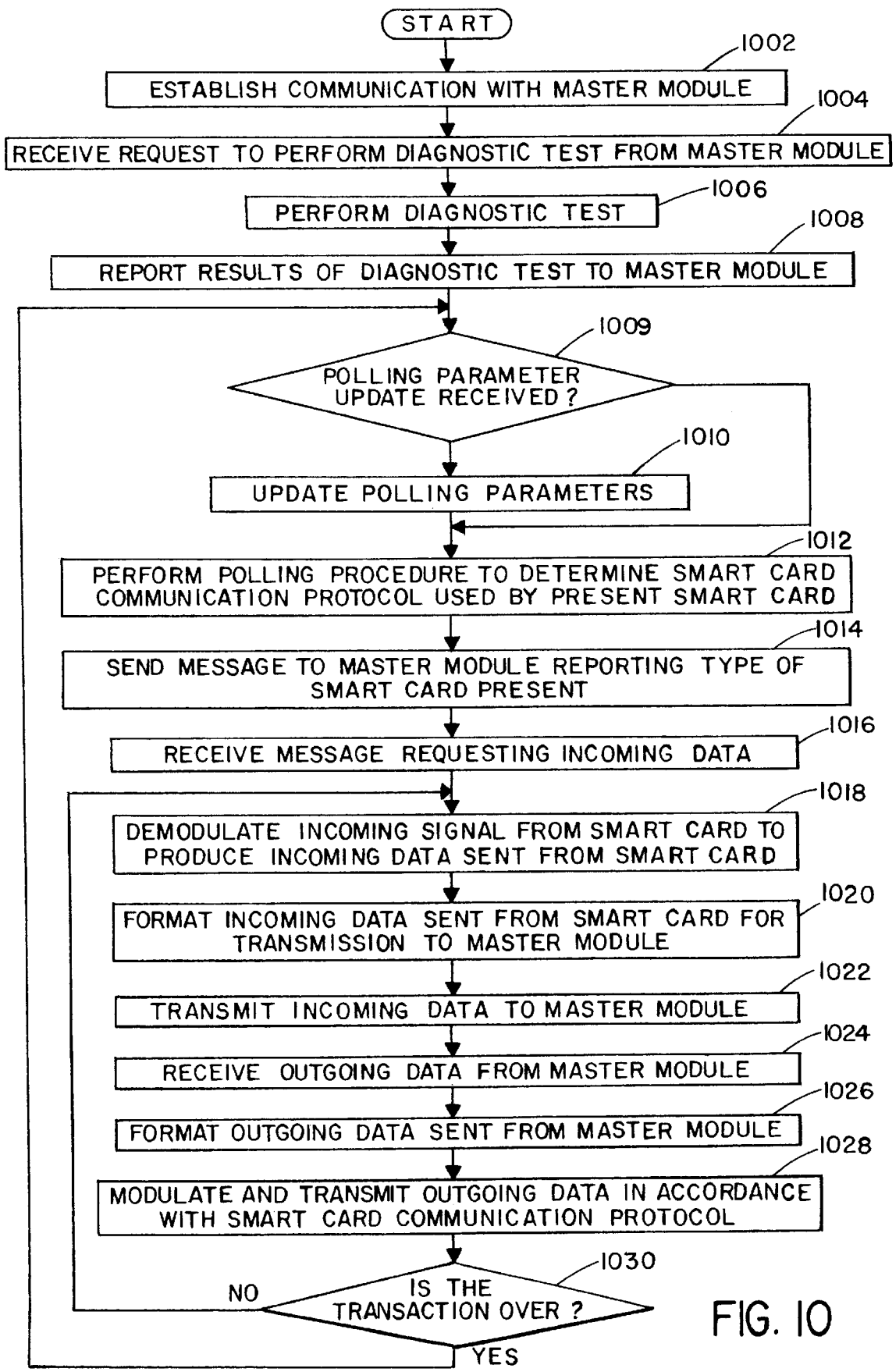
FIG. 10 is a flow chart of a method of establishing a communication link between a smart card and a master module performed at the smart card communication device in accordance with the first embodiment.

FIG. 10 is a flow chart of a method for establishing a communication link between the master module 107 and a smart card performed in the smart card communication device in accordance with the first embodiment of the invention. At step 1002, the micro-controller 208 establishes communication with the master module 107. The master module 107 and the micro-controller 208 exchange messages identifying and selecting the SCCD 104 for communication.

At step 1004, the SCCD 104 receives the instruction from the master module 107 to perform the diagnostic test. The micro-controller 208 receives a message through the communication interface instructing the microcontroller 208 to perform diagnostic testing. Although in the first embodiment the master module 107 send single message indicating that the diagnostic test should be performed, in alternate embodiments, a plurality of messages can be sent indicating specific tests that should be performed.

At step 1006, the SCCD 104 performs the diagnostic test. As described below in more detail, the micro-controller 208 performs several tests to determine the functionality of the RF transceiver, antenna and other hardware and software functions.

At step 1008, the SCCD 104 reports the results of the diagnostic test to the master module 107. After acquiring the test results of the diagnostic test, the micro-controller 208 formats and transmits the test results to the master module 107 through the communication interface and the data channel.

At step 1009, the SCCD 104 determines if a polling parameter update has been received from the master module 107. The micro-controller 208 receives a message through the communication interface transmitted by the master module 107 through the data channel indicating parameters for the polling procedure. As discussed above, the polling parameters include the number and type of smart cards that should be polled in addition to a random number necessary for anti-collision procedures of the third type of smart card communication protocol. In alternate embodiments other parameters may be included. If no polling parameters have been received the micro-controller 208 uses the last poling parameters sent that are stored in memory and continues at step 1012. If a polling parameter update has been received, the method proceeds to step 1010 where the polling parameters are updates in memory.

At step 1012, the SCCD 104 performs the polling procedure to determine the smart card communication protocol used by a present smart card. As described more detail below in reference to FIG. 11, the microcontroller 208 polls the communication channel using a plurality of initiation messages in accordance with a plurality of smart card communication protocols indicated by the polling parameters until. The micro-controller 208 continually polls the communication channel until a valid acknowledgment message is received while resolving any message collisions.

After a valid acknowledgment message is received at the SCCD 104, the SCCD 104 sends a message to the master module 107 reporting the type of smart card that is present at step 1014. Since the master module 107 has information on which smart card types are being polled, the message sent by the SCCD 104 is relatively simple conveying which one of several smart card communication protocols is used by the present smart card. For example, a two bit message can be sent indicating which of four smart card types polled has been found.

At step 1016, the SCCD 104 receives the message from the master module 107 requesting the incoming data.

At step 1018, the SCCD 104 demodulates the incoming signal from the smart card in accordance with the valid smart card communication protocol. As described above, the incoming RF signal is received through the antenna assembly and radio frequency circuit. Since the configuration of the transceiver hardware is set properly to receive the valid smart card communication protocol, the configuration is not changed. Further, the demodulator used to demodulate the incoming RF signal after it is received by the transceiver hardware is the appropriate demodulator for demodulating messages sent from the smart card. Therefore, the incoming RF signal is received through the transceiver hardware and demodulated by the appropriate demodulator in the DSP 210 to produce the incoming data stream of bits (incoming data).

At step 1020, the micro-controller 208 formats the incoming data for transmission to the master module 107. The micro-controller 208 arranges the incoming data into packets and adds any appropriate headers to the packets. Those skilled the art will recognize the various schemes that can be used to format and transmit the incoming data and that the chosen format is chosen in accordance with the particular communication system and data channel.

At step 1022, the formatted incoming data is transmitted to the master module 107. After properly formatting the incoming data, the micro-controller 208 sends the incoming data through the data channel to the master module 107.

At step 1024, the outgoing data is received from the master module 107 through the data channel.

At step 1026, the outgoing data is formatted by the SCCD 104. The micro-controller 208 removes any additional headers and formats the data into the appropriate data stream that can be modulated in accordance with the valid smart card communication protocol for transmission to the smart card.

The outgoing data stream produced by the micro-controller 208 is modulated and transmitted to the smart card 106 at step 1028. The DSP 210 uses the appropriate signal modulator to modulate the outgoing data in accordance with the valid smart card communication protocol. If a Type A card is present, for example, the DSP 210 forwards the outgoing data to the Type A modulator 402. The resulting modulated data is amplified by the driver 406 and the PA 406 and transmitted through the antenna to the smart card in accordance with the Type A smart card communication protocol.

The SCCD 104 determines if the transaction with the smart card is over at step 1030. If a end of transaction message is received form the master module 107 indicating that the transaction is over, the method returns to step 1010 where the micro-controller 208 determines if a polling parameter update has been received. If the transaction has not ended, the method returns to step 1018 where communication between the master module 107 and the smart card through the SCCD 104 continues.

Figure 11:
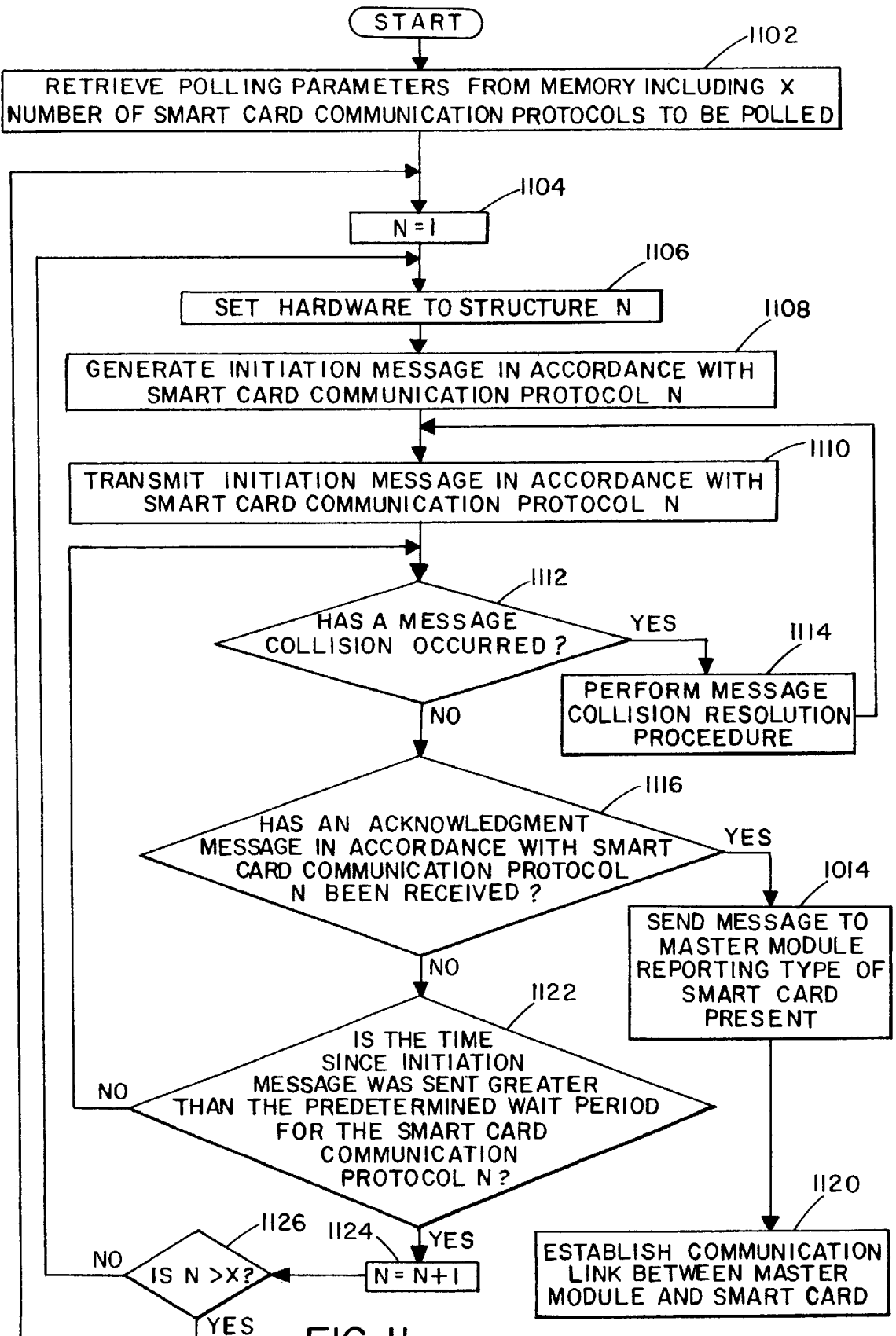
FIG. 11 is a flow chart of a method of polling for a communication channel using a plurality of smart card communication protocols in accordance with the first embodiment.

FIG. 11 is a flow chart of method of polling a communication channel in accordance with the first embodiment of the invention. As explained above, in the first embodiment, the polling procedure sequentially transmits an initiation message for each of the smart card communication protocols that are polled. In alternate embodiment, however, the polling pattern may be varied or may be adaptable to the conditions experienced by the SCCD 104. For example, if the SCCD 104 detects that a particular type of smart card is rarely detected, the master module 107 my modify the polling sequence to less frequently poll for that type of card in comparison to number of times the other cards are polled. Those skilled in art will recognize that the polling sequence is limited by parameters such as the maximum time allowed for polling establishing a connection and transferring data.

At step 1102, the SCCD 104 retrieves the polling parameters from memory. The polling parameters include the X types of cards that should be polled where X is the total number of different smart card communication protocols that will be polled.

At step 1104, protocol number is initialized by setting N equal to 1.

At step 1106, the transceiver hardware is set to the structure corresponding to the configuration required to receive messages in accordance to the Nth smart card communication protocol. Therefore, during the first cycle through the method, the transceiver hardware is set to the configuration to receive the first smart card communication protocol. In the first embodiment, the first smart card communication protocol is the Type A protocol and, therefore, the transceiver hardware is configured to receive the sub-carrier channel at 847.5 kHz.

At step 1108, the micro-controller 208 generates the initiation message corresponding to the Nth smart card communication protocol the micro-controller 208 retrieves from memory a data string corresponding to the initiation message for the particular protocol that will be polled.

At step 1110, the initiation message is transmitted in accordance with the nth smart card communication protocol. For the Type A protocol, the initiation message is transmitted through the Type A modulator.

At step 1112, the SCCD 104 determines if a message collision has occurred. If the SCCD 104 determines that a message collision has occurred, the method precedes to step 1114 where the SCCD 104 performs the message collision resolution procedure. The details of the collision resolution procedure in accordance with the first embodiment is discussed in more detail in U.S. patent application Ser. No. 08/825,940 filed on Apr. 01, 1997 which is incorporated by reference herein.

If the SCCD 104 determines that message collision has not occurred, the method proceeds to step 1116 wherein the SCCD 104 determines if a valid acknowledgment message in accordance with the nth smart card communication protocol has been received. The incoming RF signal transmitted from the smart card is demodulated using the demodulator corresponding to the Nth smart card communication protocol. The demodulator produces an incoming data stream (incoming data) as described above in reference to the various demodulators implemented in the DSP 210 the micro-controller 208 retrieves a valid acknowledgment message corresponding to the nth smart card communication protocol and compares the incoming data to the stored valid acknowledgment message. If the micro-controller 208 determines that the incoming data is a valid acknowledgment message, the method continues at step 1014. Otherwise, the method proceeds to step 1122.

As described above in reference to FIG. 10, the SCCD 104 sends a message to the master module 107 reporting the type of smart card present at step 1014. The method proceeds to step 1120 where a communication link is established between the master module 107 and the smart card as described in reference to steps 1016 through 1030 of FIG. 10.

At step 1122, the SCCD 104 determines if the time since the last initiation message was sent is greater than the predetermined wait period for the smart card communication protocol N. If the time is not greater than the predetermined wait period, the method continues to monitor the communication channel by returning to step 1112.

If the time is greater than the predetermined wait period, the method proceeds to step 1124 where N is incremented by 1.

At step 1126, the SCCD 104 determines is N is greater than X. If N is greater is than X, indicating that each of the smart card communication protocols has been polled, the method returns to step 1104 where N is reset to one and the method continues the polling procedure.

If the N is not greater than X, the method returns to step 1106. At step 1106, the transceiver hardware is set to the new Nth configuration and the procedure continues using the new value of N.

Therefore, the SCCD 104 sets the transceiver hardware to the appropriate (Nth) configuration at step 1106 SCCD 104, sends an initiation message at step 1110 and monitors the communication channel at steps 1112 through 1122.

Figure 12:
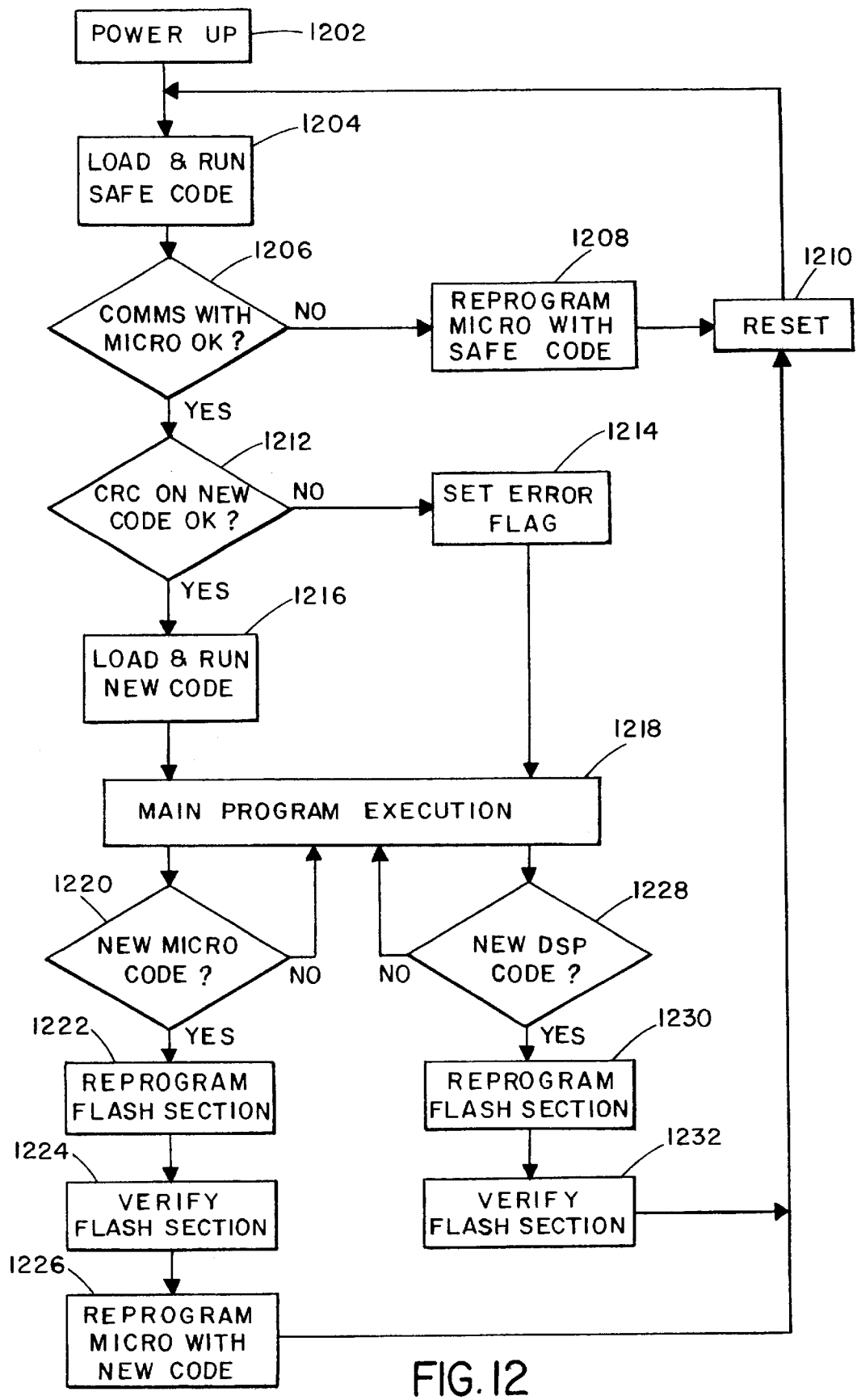
FIG. 12 is a flow chart of a method of re-programming firmware in the smart card communication device in accordance with the first embodiment of the invention.

FIG. 12 is a flow chart of a method of re-programming the SCCD 104 from a remote location in accordance with the first embodiment of the invention. As explained above, the code in the DSP 210 is changed by the master module 107 through the data channel 204. The procedure may be initiated by the central computer system 102 or computer 113. Further, the reprogramming procedure may be performed by devices other than the master module 1076 in alternate embodiments.

At step 1202, the DSP 210 performs a standard power up procedure. At step 1204, the DSP 210 runs the safe code after loading it from the DSP EEPROM 230.

At step 1206, the DSP 210 determines if communications with the micro-controller 208 are being performed validly. If the DSP 210 cannot establish valid communications with the micro-controller 208, the procedure continues at step 1208. If the valid communications are established, the procedure continues at step 1212.

At step 1208, the DSP 210 re-programs the micro-controller 208 with the safe code by replacing the code in the EEPROM 228 with the safe code. The procedure continues at step 1210 where the system is reset. After the reset, the system returns to step 1204 where the safe code is loaded and run again.

At step 1212 the DSP 210 determines if the cyclic redundancy check (CRC) is valid for the new code. If the CRC is not valid an error flag is set at step 1214 and the procedure continues with the main program execution at step 1218.

If the CRC is valid, the new code is loaded from the DSP EEPROM 228 and run at step 1216. The procedure continues at step 1218.

At step 1220, the DSP 210 determines if the micro-controller 208 will be re-programed with new code. If the micro-controller 208 will not be re-programmed, the procedure returns to step 1218. Otherwise, the procedure continues at step 1222.

At step 1222, the flash sections of the EEPROM 228 are replaced with the new micro-controller 208 code. At step 1224, the flash sections are verified by a "read back" from the master module 107.

At step 1226, the micro-controller 208 is re-programed with the new code from the EEPROM 228. After the micro-controller 208 is re-programed the system is reset and the procedure returns step 1204.

At step 1228, the DSP 210 determines if the DSP 210 is to be re-programed. If the DSP 210 determines that there is no new code for the DSP 210, the procedure returns to step 1218 and continues to execute the main program.

The flash sections of the DSP EEPROM 1228 are loaded with the new DSP code at step 1230 if it is determined that the DSP 210 is to be re-programed.

At step 1232, the flash sections are verified and the system is reset at step 1210. The procedure continues at step 1204.

New code is transmitted from a remote source and loaded into the appropriate flash sections of the DSP EEPROM 230. The code is loaded and run and if necessary code is loaded onto the flash sections of the micro-controller EEPROM 228. If valid communications can not be established, the processors load and execute safe code. In this way, complete system failures due to inadequate, faulty, or incomplete code are reduced. New code can be loaded to modify a variety of functions typically controlled by either the DSP 210 or the micro-controller 208. The new code can be dynamically loaded to a specific SCCD 104 or a plurality of SCCD 104 depending on the particular requirements of the system and the reason for the new code.

A plurality of smart card types can be linked to the master module 107 and the central computer system 102 by implementing a plurality of demodulation and modulation methods in accordance with a plurality of smart card communication protocols. The configuration of transceiver hardware 212 can also be modified to facilitate the receiving from or transmitting to different types of smart cards 106.

The SCCD 104 can be re-programed to communicate using additional smart card communication protocols by modifying the code in the DSP 210. The communication system 100, therefore, provides a dynamic and flexible device, system and method for establishing a communication link between the central computer system 102 and a smart card 106 using any one of a plurality of smart card communication protocols.

Other embodiments and modifications of the present invention will occur readily to those of ordinary skill in the art in view of these teachings. Such persons will appreciate the symmetries among the various embodiments illustrated above and understand that their elements may be arranged in other ways to produce similar results. For example, other types processors or logic such as FPGAs or Complex Programmable Logic Devices (CPLD) can be used to facilitate the functionality of the DSP 210 or micro-controller 208 without departing from the scope of the invention. Therefore, this invention is to be limited only by the following claims, which include all such other embodiments and modifications when viewed in conjunction with the above specification and accompanying drawings.

We claim:

1. A method of establishing a communication link between a communication device and a smart card adapted to communicate using a valid smart card communication protocol, wherein the valid smart card communication protocol is one of a plurality of smart card communication protocols, the method comprising the steps of:

transmitting a plurality of initiation messages, wherein each of the plurality of initiation messages corresponds to each of the plurality of smart card communication protocols;

receiving an acknowledgment message in accordance with the valid smart card communication protocol from the smart card; and establishing the communication link using the valid smart card communication protocol.

2. A method in accordance with claim 1 wherein the step of transmitting comprises the step of transmitting the plurality of initiation messages through a single communication channel.

3. A method in accordance with claim 2 wherein the step of receiving comprises the step of receiving the acknowledgement message through the single communication channel.

4. A method in accordance with claim 1 wherein the step of transmitting comprises the steps of:

transmitting a first initiation message in accordance with a first smart card communication protocol;

monitoring, for a first predetermined time, a communication channel for a first acknowledgment message in accordance with the first smart card communication protocol;

transmitting a second initiation message in accordance with a second smart card communication protocol;

monitoring, for a second predetermined time, the communication channel for a second acknowledgment message in accordance with the second smart card communication protocol; and repeating the steps of transmitting the first initiation message, monitoring the communication channel for the first acknowledgment message, transmitting the second initiation message and monitoring the communication channel for the second acknowledgment message until the acknowledgment message in accordance with the valid smart card communication protocol is received.

5. A method in accordance with claim 1 wherein the step of establishing the communication link comprises the steps of:

establishing a first communication link between a master module and the smart card using the valid smart card communication protocol; and establishing a second data communication link between the master module and a central computer system.

6. A method in accordance with claim 5 wherein the step of establishing the communication link between the master module and the smart card comprises the steps of:

configuring transceiver hardware in accordance with the valid smart card communication protocol to acquire an incoming signal in accordance with the valid smart card communication protocol; and demodulating the incoming signal in accordance with the valid smart card communication protocol.

7. A method of establishing a communication link between a central computer system and a smart card, the communication link using a valid smart card communication protocol of a plurality of smart card communication protocols, the method comprising the steps of:

polling a communication channel using the plurality of smart card communication protocols, comprising the steps of;

receiving a poll message from the central computer system, the poll message identifying the plurality of smart card communication protocols;

instructing a digital signal processor to generate an initiation message in accordance with a smart card communication protocol of the plurality of smart card communication protocols;

configuring transceiver hardware in accordance with the smart card communication protocol;

transmitting the initiation message through the communication channel;

waiting a predetermined wait period associated with the smart card communication protocol unless a valid acknowledgment message is received; and repeating, for another smart card communication protocol of the plurality of smart card communication protocols, the steps of instructing, configuring the transceiver hardware, transmitting the initiation message, and waiting;

identifying the valid smart card communication protocol when the valid acknowledgment message is received through the communication channel; and establishing the communication link between the smart card and the central computer system through the communication channel using the valid smart card communication protocol.

8. A method in accordance with claim 7 further comprising the steps of:

shifting an incoming radio frequency signal to a desired frequency bandwidth to produce a shifted signal;

converting the shifted signal to a digital signal; and demodulating the digital signal in accordance with the smart card communication protocol.

9. A method in accordance with claim 8 wherein the step of shifting the incoming radio frequency signal comprises the step of shifting the incoming radio frequency signal to a baseband frequency bandwidth.

10. A method in accordance with claim 8 wherein the step of shifting the incoming radio frequency signal comprises the step of shifting the incoming radio frequency to a subcarrier frequency bandwidth.

11. A method of establishing a communication link between a communication device and a smart card adapted to communicate using a valid smart card communication protocol, wherein the valid smart card communication protocol is one of a plurality of smart card communication protocols, the method comprising the steps of:

sequentially transmitting a plurality of initiation messages, wherein each of the plurality of initiation messages corresponds to each of the plurality of smart card communication protocols;

monitoring a communication channel for an acknowledgment message corresponding to one of the plurality of smart card communication protocols until an acknowledgment message in accordance with the valid smart card communication protocol is received; and establishing the communication link using the valid smart card communication protocol.

12. A smart card communication device for establishing a communication link between a smart card and a computer, the smart card communication device comprising:

a transceiver having a variable structure responsive to a control signal;

a digital signal processor coupled to the transceiver;

a controller coupled to the digital signal processor and the transceiver, the controller adapted to generate the control signal based on a plurality of smart card communication protocols.

13. A smart card communication device in accordance with claim 12 wherein the controller is further adapted to instruct the digital signal processor to demodulate an incoming signal received by the transceiver in accordance with the plurality of smart card communication protocols.

14. A smart card communication device in accordance with claim 13 wherein the transceiver comprises:

a radio frequency transmitter adapted to generate an electromagnetic field; and a radio frequency receiver adapted to detect variations in the electromagnetic field.

15. A smart card communication device in accordance with claim 14 wherein the radio frequency receiver comprises:

a first configuration based on the control signal and adapted to shift a data signal modulated onto an incoming radio frequency signal to a first desired frequency bandwidth; and a second configuration based on the control signal and adapted to shift the data signal to a second desired frequency bandwidth.

16. A smart card communication device in accordance with claim 15, wherein the digital signal processor comprises:

a first demodulator adapted to demodulate the data signal in accordance with a first smart card communication protocol of the plurality of smart card communication protocols;

a second demodulator adapted to demodulate the data signal in accordance with a second smart card communication protocol of the plurality of smart card communication protocols.

17. A smart card communication device in accordance with claim 16, wherein:

the first desired frequency bandwidth is a baseband frequency bandwidth; and the second desired frequency bandwidth is a subcarrier frequency bandwidth.

18. A smart card communication device in accordance with claim 12, wherein the controller is further adapted to receive a plurality of commands from a master module instructing the controller to poll for one or more smart cards, wherein each smart card corresponds to one of the plurality of smart card communication protocols.

19. A smart card communication device for communicating with a smart card using a valid smart card communication protocol of a plurality of smart card communication protocols, the device comprising:

a digital signal processor adapted to generate a plurality of initiation messages wherein each of the initiation messages is in accordance with each of the plurality of smart card communication protocols; and a transceiver coupled to the digital signal processor and adapted to transmit the plurality of initiation messages in accordance with a modulation type corresponding to an initiation message of the plurality of initiation messages corresponding to a first smart card communication protocol of the plurality of smart card communication protocols.

20. A digital signal processor comprising:

a first demodulator adapted to demodulate a first incoming data signal in accordance with a first smart card communication protocol, wherein the first demodulator is a split phase demodulator adapted to demodulate the first incoming data signal modulated using amplitude shift keying modulation for contactless smart cards;

a second demodulator adapted to demodulate a second incoming data signal in accordance with a second smart card communication protocol, wherein the second demodulator is a Costas loop demodulator adapted to demodulate the second incoming data signal modulated using amplitude shift keying modulation for contactless smart cards; and a third demodulator adapted to demodulate a third incoming data signal in accordance with a third smart card communication protocol.

21. A radio frequency circuit adapted for establishing a communication link with a smart card using any one of a plurality of smart card communication protocols, the radio frequency circuit comprising:

a first configuration based on a control signal and adapted to acquire a data signal modulated onto an incoming radio frequency signal in accordance with a first smart card communication protocol of the plurality of smart card communication protocols; and a second configuration based on the control signal and adapted to acquire a data signal modulated on to the incoming radio frequency signal in accordance with a second smart card communication protocol of the plurality of smart card communication protocols.

22. A radio frequency circuit in accordance with claim 21, wherein the first configuration comprises a mixer adapted to shift the signal to a baseband frequency band.

23. A radio frequency circuit in accordance with claim 22, wherein the second configuration comprises a filter coupled to an output of the mixer, the filter having a frequency response minimizing signals outside a subcarrier bandwidth.

24. A radio frequency circuit in accordance with claim 23, further comprising:
 a analog to digital converter; and
 a switch adapted to couple the output of the mixer to the analog to digital converter in a first mode and adapted to couple an output of the filter to the analog to digital converter in a second mode.

25. A radio frequency circuit adapted for use in a smart card communication device, the radio frequency circuit comprising:
 a first mixer adapted to shift an incoming radio frequency signal to a baseband frequency to produce a baseband signal;
 a second mixer shifting the baseband signal to a subcarrier frequency; and
 a switch having a first input port coupled to the first mixer, a second input port coupled to an output of the second mixer, and an output port, the switch adapted to couple the first input port to the output port in a first mode and the second input port to the output port in a second mode.

26. A radio frequency circuit in accordance with claim 25 further comprising an analog to digital converter coupled to the output port of the switch.

27. A radio frequency circuit in accordance with claim 25 wherein the switch is adapted to receive a control signal for indicating one of the first mode and the second mode, the first mode corresponding to at least a first smart card communication modulation scheme and the second mode corresponding to at least a second smart card communication scheme.

28. A method of communicating with a non-contact smart card comprising the steps of:
 establishing a radio frequency communication channel between a smart card communication device and the non-contact smart card, comprising the steps of;
  demodulating an incoming radio frequency signal transmitted from the non-contact smart card to produce an incoming bit data stream;
  modulating an outgoing bit data stream transmitted from the remotely located master module to produce an outgoing radio frequency signal;
  arranging the incoming bit data stream into a plurality of incoming data packets; and
  appending a header to at least one packet of the plurality of incoming data packets, the header including information indicating a security device type;
 establishing a data channel between the smart card communication device and a remotely located master module; and
 establishing a secure communication channel between the remotely located master module and, the non-contact smart card using a security device within the remotely located master module, comprising the steps of:
  removing the header from the at least one packet to produce incoming data at the remotely located master module; and
  routing the incoming data to the security device based on the information included in the header, wherein the security device is one of a plurality of security devices within the master module.

29. A method of remotely re-programing a smart card communication device comprising the steps of:
 transmitting new code through a data channel from a central computer system through a master module coupled to a network;
 storing the new code in a memory device; and
 loading the new code from the memory device to a processor.

30. A method in accordance with claim 29 wherein the new code facilitates a demodulation of a signal transmitted in accordance with a smart card communication protocol.

31. A method in accordance with claim 29, wherein the memory device is an electrically erasable programable read only memory device.

32. A method in accordance with claim 29, wherein the memory device is a ferro-electric random access memory device.

* * * * *

(12) EX PARTE REEXAMINATION CERTIFICATE (7779th)
United States Patent
Bonneau et al.

(10) Number: US 6,577,229 C1
(45) Certificate Issued: Sep. 28, 2010

(54) MULTIPLE PROTOCOL SMART CARD COMMUNICATION DEVICE

(75) Inventors: Walter C. Bonneau, Escondido, CA (US); Tom Vilhelmsen, Hozbaek (DK); Carlos Ribeiro, San Diego, CA (US); Stefan Rousseau, San Diego, CA (US); Phil Dixon, San Diego, CA (US)

(73) Assignee: Cubic Corporation, San Diego, CA (US)

Reexamination Request:
No. 90/007,068, Jun. 8, 2004

Reexamination Certificate for:
Patent No.: 6,577,229
Issued: Jun. 10, 2003
Appl. No.: 09/329,775
Filed: Jun. 10, 1999

(51) Int. Cl.
*G06K 7/00* (2006.01)
*G06F 7/10* (2006.01)

(52) U.S. Cl. .................. 340/10.41; 235/379; 235/492
(58) Field of Classification Search .............. 340/10.3, 340/10.6, 10.41; 235/379, 441, 449, 493
See application file for complete search history.

(56) References Cited

U.S. PATENT DOCUMENTS

| | | | | |
|---|---|---|---|---|
| 5,193,114 A | * | 3/1993 | Moseley | 713/183 |
| 5,235,326 A | | 8/1993 | Beigel et al. | 340/825.54 |
| 5,310,999 A | * | 5/1994 | Claus et al. | 235/384 |
| 5,349,649 A | | 9/1994 | Iijima | |
| 5,420,412 A | | 5/1995 | Kowalski | |
| 5,444,222 A | | 8/1995 | Inoue | |
| 5,581,708 A | | 12/1996 | Iijima | |
| 5,640,002 A | | 6/1997 | Ruppert et al. | |
| 5,664,157 A | | 9/1997 | Takahira et al. | |
| 5,679,945 A | | 10/1997 | Renner et al. | |
| 5,727,230 A | | 3/1998 | Fujioka | |
| 5,759,102 A | | 6/1998 | Pease et al. | 463/42 |
| 5,852,290 A | * | 12/1998 | Chaney | 235/492 |
| 5,894,478 A | | 4/1999 | Barzegar et al. | |
| 5,952,935 A | | 9/1999 | Mejia et al. | 340/825.44 |
| 5,991,749 A | | 11/1999 | Morrill, Jr. | |
| 6,036,100 A | | 3/2000 | Asami | |
| 6,098,890 A | | 8/2000 | Kreft et al. | |
| 6,131,040 A | | 10/2000 | Knuutila et al. | |
| 6,157,966 A | | 12/2000 | Montgomery et al. | 710/8 |

(Continued)

FOREIGN PATENT DOCUMENTS

| | | |
|---|---|---|
| DE | 19635311 A1 | 3/1998 |
| EP | 0 768 540 | 4/1997 |
| GB | 2 305 074 | 3/1997 |
| JP | 7-230560 | 8/1995 |
| JP | 9218263 | 8/1997 |
| JP | 10214314 | 8/1998 |
| WO | WO 97/00501 | 1/1997 |
| WO | WO/97/05582 A1 | 2/1997 |

OTHER PUBLICATIONS

Rankl W. and W. Effing, "SmartCard Handbook", John Wiley & Sons, 1997, pp. 12, 173–190.*
"Generalisation de la telebillettique en lle–de France— Schema de Principe". *Syndicate de Transports Parisiens— Conseil D'Administration* (1999) p. 1–19.

(Continued)

*Primary Examiner*—Majid A. Banakhah

(57) ABSTRACT

A communication link is established between the smart card and a computer using a valid smart card communication protocol. A smart card communication device determines the valid smart card communication protocol used by a smart card by polling a communication channel using a plurality of smart card communication protocols until a valid acknowledgement message is received. A radio frequency circuit is configured to communicate with the smart card using the valid smart card communication protocol. A digital signal processor having at least two demodulators demodulates an incoming data stream produced by the receiver in accordance with the valid smart card communication protocol in a dynamically reconfigurable manner.

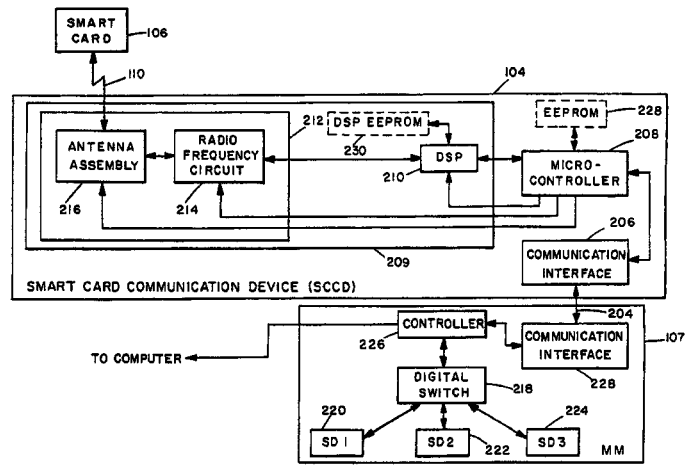

U.S. PATENT DOCUMENTS

| | | | |
|---|---|---|---|
| 6,216,015 | B1 | 4/2001 | Hymel |
| 6,247,644 | B1 * | 6/2001 | Horne et al. ................. 235/380 |
| 6,360,952 | B1 | 3/2002 | Kimlinger et al. |
| 6,378,774 | B1 | 4/2002 | Emori et al. |
| 6,405,254 | B1 | 6/2002 | Hadland ..................... 709/230 |
| 6,411,199 | B1 | 6/2002 | Geiszler et al. ............ 340/10.1 |
| 6,434,403 | B1 | 8/2002 | Ausems et al. |
| 6,442,532 | B1 | 8/2002 | Kawan |
| 6,557,752 | B1 | 5/2003 | Yacoob |
| 6,567,394 | B1 | 5/2003 | Arisawa |
| 2002/0198837 | A1 * | 12/2002 | Wagner ........................ 705/41 |

OTHER PUBLICATIONS

Website copy of communication of STIF, excerpted from "Generalisation de la telebillettique en lie–de France—Schema de Principe", *Syndicat de Transports Parisiens—Conseil D'Administration* (1999) p. 6.

ISO/IEC 14443–2, Committee Draft re. Identification cards—Contactless integrated circuit(s) cards—Proximity cards, Part 2: Radio frequency power and signal interface (Oct. 20, 1998), p. i–8.

ISO/IEC 14443–3, Committee Draft re. Identification cards—Contactless integrated circuit(s) cards—Proximity cards, Part 3: Initialization and anticollision (Oct. 20, 1998), p. i–5.

ISO/IEC 14443–3, 2nd Committee Draft re. Identification cards—Contactless integrated circuit(s) cards—Proximity cards, Part 3: Initialization and anticollision (Feb. 28, 1999), p. i–5.

ISO/IEC 14443–2, Final Committee Draft re. Identification cards—Contactless integrated circuit(s) cards—Proximity cards, Part 2:Radio frequency power and signal interface (Mar. 26, 1999), p. i–8.

International Standard Organization (ISO) Committee draft of ISO/IEC 14443–2 entitled "Identification Cards—Contactless Integrated Circuit(s) Cards—Proximity Cards, Part 2: Radio Frequency Power and Signal Interface," dated Jun. 2, 1998, citable under 35 U.S.C. §§ 102(a) and (b).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11, 19, 20, 25-27 and 28 is confirmed.

Claims 29-32 are cancelled.

Claims 12 and 21 are determined to be patentable as amended.

Claims 13-18 and 22-24, dependent on an amended claim, are determined to be patentable.

New claims 33 and 34 are added and determined to be patentable.

12. A smart card communication device for establishing a communication link between a smart card and a computer, the smart card communication device comprising:
   a transceiver having a variable structure responsive to a control signal, *and configured to generate each of a plurality of initiation messages based on the control signal, wherein each of the plurality of initiation messages is in accordance with a distinct smart card communication protocol*;
   a digital signal processor coupled to the transceiver;
   a controller coupled to the digital signal processor and the transceiver, the controller adapted to generate the control signal based on a plurality of smart card communication protocols.

21. A radio frequency circuit adapted for establishing a communication link with a smart card using any one of a plurality of smart card communication protocols, the radio frequency circuit comprising:
   a first configuration based on a control signal and adapted to acquire a data signal modulated onto an incoming radio frequency signal in accordance with a first smart card communication protocol of the plurality of smart card communication protocols, *wherein the data signal is received in response to a transmitted initiation message of the first smart card communication protocol*; and
   a second configuration based on the control signal and adapted to acquire a data signal modulated on to the incoming radio frequency signal in accordance with a second smart card communication protocol of the plurality of smart card communication protocols, *wherein the data signal is received in response to a transmitted initiation message of the second smart card communication protocol*.

*33. A method of establishing a communication link between a communication device and a smart card adapted to communicate using a valid smart card communication protocol, wherein the valid smart card communication protocol is one of a plurality of smart card communication protocols, the method comprising the steps of:*
   *transmitting a plurality of initiation messages via a reconfigurable transceiver, wherein each of the plurality of initiation messages corresponds to a distinct one of the plurality of smart card communication protocols;*
   *receiving an acknowledgement message in accordance with the valid smart card communication protocol from the smart card and in response to a corresponding one of the plurality of initiation messages; and*
   *establishing the communication link using the valid smart card communication protocol.*

*34. A method of establishing a communication link between a communication device and a smart card adapted to communicate using a valid smart card communication protocol, wherein the valid smart card communication protocol is one of a plurality of smart card communication protocols, the method comprising the steps of:*
   *transmitting a plurality of initiation messages, wherein each of the plurality of initiation messages corresponds to each of the plurality of smart card communication protocols;*
   *receiving an acknowledgement message in accordance with the valid smart card communication protocol from the smart card during the transmission of an initiation message corresponding to the valid smart card communication protocol; and*
   *establishing the communication link using the valid smart card communication protocol.*

\* \* \* \* \*